United States Patent
Shao et al.

(10) Patent No.: US 12,062,202 B2
(45) Date of Patent: Aug. 13, 2024

(54) VISUAL LOCALIZATION AGAINST A PRIOR MAP

(71) Applicant: Argo AI, LLC, Pittsburgh, PA (US)

(72) Inventors: Weizhao Shao, Santa Clara, CA (US); Ankit Kumar Jain, Mountain View, CA (US); Xxx Xinjilefu, Pittsburgh, PA (US); Gang Pan, Fremont, CA (US); Brendan Christopher Byrne, Detroit, MI (US)

(73) Assignee: Argo AI, LLC, Pittsburgh, PA (US)

( * ) Notice: Subject to any disclaimer, the term of this patent is extended or adjusted under 35 U.S.C. 154(b) by 391 days.

(21) Appl. No.: 17/485,046

(22) Filed: Sep. 24, 2021

(65) Prior Publication Data
US 2023/0094695 A1    Mar. 30, 2023

(51) Int. Cl.
*G06T 7/70* (2017.01)
*G01C 21/30* (2006.01)
*G06T 7/50* (2017.01)

(52) U.S. Cl.
CPC .............. *G06T 7/70* (2017.01); *G01C 21/30* (2013.01); *G06T 7/50* (2017.01); *G06T 2207/10028* (2013.01); *G06T 2207/30252* (2013.01)

(58) Field of Classification Search
CPC .......................................... G06T 2207/10028
See application file for complete search history.

(56) References Cited

U.S. PATENT DOCUMENTS

| | | |
|---|---|---|
| 8,542,745 B2 | 9/2013 | Zhang et al. |
| 9,665,403 B2 | 5/2017 | Siepmann et al. |
| 9,870,624 B1 | 1/2018 | Narang et al. |
| 10,338,223 B1 | 7/2019 | Englard et al. |
| 10,401,866 B2 | 9/2019 | Rust |
| 10,614,541 B2 | 4/2020 | Storey et al. |
| 2007/0031064 A1 | 2/2007 | Zhao et al. |
| 2017/0216981 A1* | 8/2017 | Lee .................. B23P 11/005 |
| 2018/0341019 A1 | 11/2018 | Sakai et al. |
| 2018/0373564 A1 | 12/2018 | Hushchyn |
| 2019/0061771 A1 | 2/2019 | Bier et al. |
| 2019/0080166 A1 | 3/2019 | Zhu et al. |
| 2019/0080167 A1 | 3/2019 | Zhu et al. |

(Continued)

FOREIGN PATENT DOCUMENTS

| | | |
|---|---|---|
| WO | WO 2020/147134 | 7/2020 |
| WO | WO 2020/154966 | 8/2020 |
| WO | WO 2021/056190 | 4/2021 |

OTHER PUBLICATIONS

Engel et al., "Direct Sparse Odometry", arXiv:1607.02565v2 [cs.CV] Oct. 7, 2016.

*Primary Examiner* — Di Xiao
(74) *Attorney, Agent, or Firm* — Sterne, Kessler, Goldstein & Fox P.L.L.C.

(57) ABSTRACT

A system and method for performing visual localization is disclosed. In aspects, the system implements methods to generate a global point cloud, the global point cloud representing a plurality of point clouds. The global point cloud can be mapped to a prior map information to locate a position of an autonomous vehicle, the prior map information representing pre-built geographic maps. The position of the autonomous vehicle can be estimated based on applying sensor information obtained from sensors and software of the autonomous vehicle to the mapped global point cloud.

17 Claims, 9 Drawing Sheets

(56) References Cited

U.S. PATENT DOCUMENTS

| | | |
|---|---|---|
| 2019/0080470 A1 | 3/2019 | Zhu et al. |
| 2019/0154842 A1 | 5/2019 | Adachi |
| 2019/0317600 A1* | 10/2019 | White ................ G01C 21/3647 |
| 2020/0098135 A1* | 3/2020 | Ganjineh .............. G06F 16/583 |
| 2020/0098161 A1 | 3/2020 | Smith et al. |
| 2020/0278450 A1* | 9/2020 | Lasang ..................... G06T 7/73 |
| 2020/0309957 A1* | 10/2020 | Bhaskaran .............. G01S 17/86 |
| 2021/0011161 A1 | 1/2021 | Chen et al. |
| 2021/0033706 A1 | 2/2021 | Funaya |
| 2021/0215489 A1* | 7/2021 | Zhang ................ G01C 21/3848 |
| 2022/0230451 A1* | 7/2022 | Hüger ................. G06V 20/584 |

\* cited by examiner

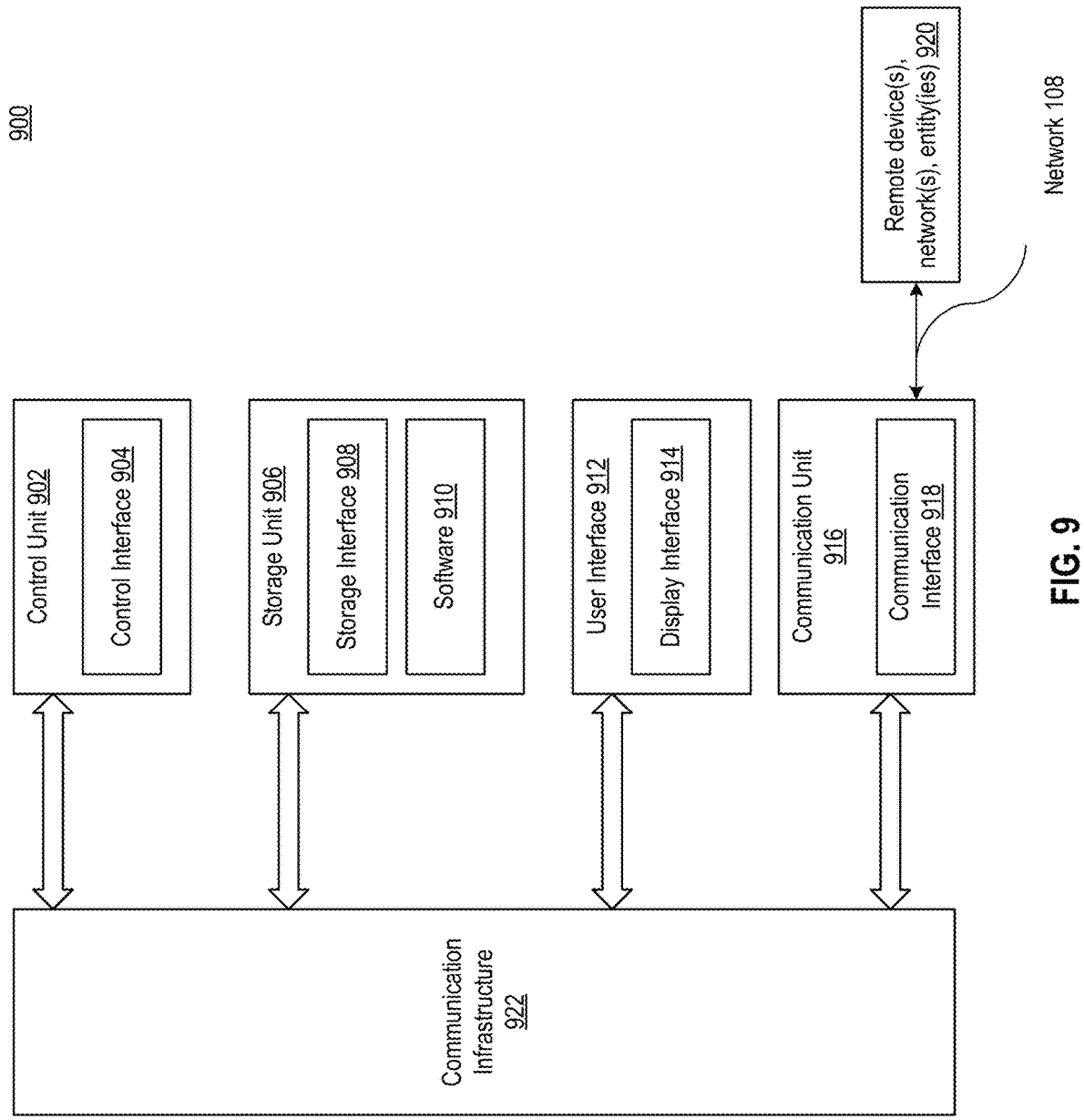

VISUAL LOCALIZATION AGAINST A PRIOR MAP

TECHNICAL FIELD

Aspects relate to systems and methods utilized in autonomous vehicle navigation.

BACKGROUND

Autonomous navigation of vehicles is the next frontier for the transportation industry. The benefits of autonomous vehicle navigation are numerous. For example, autonomous driving has the promise of reducing hazardous driving conditions and/or accidents by eliminating the need for humans to control and/or operate vehicles. Instead, computer systems can work in conjunction with predetermined maps, cameras, LiDAR systems, and/or grids to assist in navigating the vehicle. The computer systems can help better control a vehicle's speed and reaction time to events in the vehicle's surroundings than a human can. Thus, these computer systems can help greatly reduce accidents. Another benefit of autonomous vehicle navigation is that vehicles may be deployed and operated for longer periods. Because human operators are no longer needed, frequent stops that human operators have to make, for example to rest, etc., may be eliminated allowing non-stop transportation. As a result, and in the case of autonomous driving, humans can, instead of driving, tend to other matters while in the vehicle like reading, working, or simply relaxing.

Autonomous vehicle navigation, however, still has some challenges. For example, conventional autonomous vehicle navigation systems still lack the ability for vehicles to navigate routes if the pre-loaded maps and/or GPS guidance systems fail. This can lead to situations where vehicles are blindly navigating without knowledge of their surroundings. Thus, fallback systems are needed in situations in which the vehicle loses contact with the GPS systems and/or the pre-loaded maps fail or do not have sufficient information to allow the vehicle to navigate its surroundings. Systems and methods are needed to address the aforementioned problems.

BRIEF DESCRIPTION OF THE DRAWINGS

The accompanying drawings are incorporated herein and form a part of the specification.

FIG. 9 is an example architecture of the components implementing the computing system in aspects of the disclosure.

In the drawings, like reference numbers generally indicate identical or similar elements. Additionally, generally, the left-most digit(s) of a reference number identifies the drawing in which the reference number first appears

DETAILED DESCRIPTION

Figure 1:
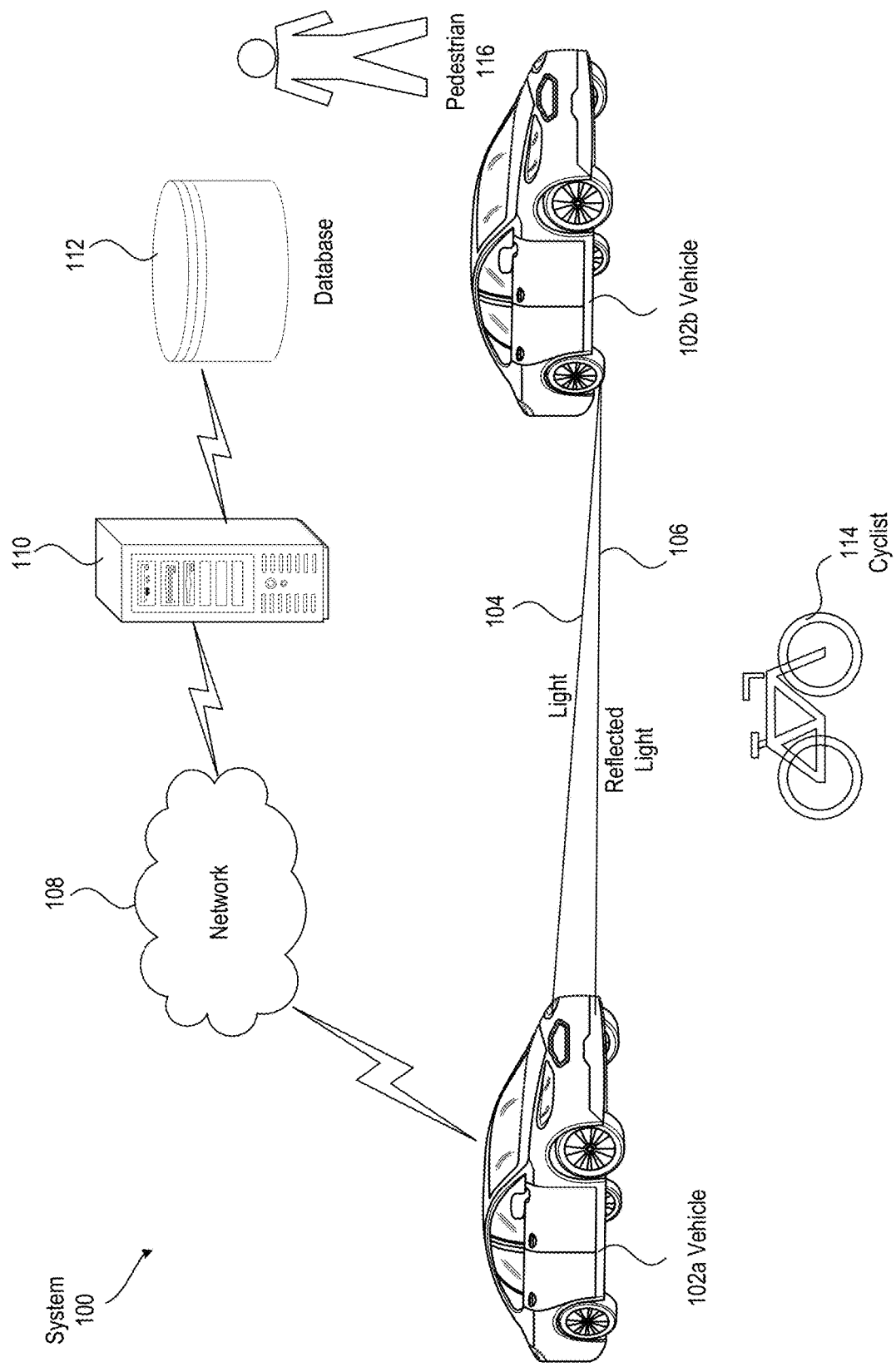
FIG. 1 shows an exemplary autonomous vehicle system in accordance with aspects of the disclosure.

Aspects disclosed herein provide a novel architecture for a computing system that may be utilized for performing visual odometry for vehicle navigation. Visual odometry refers to the process of determining the position and orientation of an autonomous vehicle by analyzing camera images. In aspects, the visual odometry can provide a fallback system for helping navigate the autonomous vehicle if GPS systems, pre-loaded maps, and/or other systems utilized to navigate the autonomous vehicle fail. In this way, the autonomous vehicle can continue operating and/or have time to fail gracefully in situations in which it would otherwise have little to no idea of the environment in which it is operating. In aspects, the computing system can implement a camera based approach for performing the visual odometry. In aspects, the camera based approach can allow the autonomous vehicle to use built in and/or integrated cameras of the vehicle to dynamically generate a map of the vehicle's surroundings. In aspects, this generating may be done on the fly and in real-time while the autonomous vehicle is being operated. In this way, the computing system can allow the autonomous vehicle to get a sense of its surroundings so that it can continue to safely operate for a period of time, until the GPS systems, pre-loaded maps, and/or other systems utilized to navigate the autonomous vehicle can come back online. Alternatively or in conjunction, the computing system can allow the autonomous vehicle to operate until it may be navigated to an area where it may be safely shut down.

The computing system improves conventional systems by providing a novel way to perform the processing required to perform the visual odometry. In aspects, the improvement stems from splitting the processing functions required to perform the visual odometry between a graphics processing unit (GPU) and a central processing unit (CPU). It has been discovered that the splitting of the processing functions in this way greatly improves processing times for performing the visual odometry. Partitioning the processing this way also reduces latency in the overall system and greatly improves the time it takes to perform the visual odometry. In aspects, partitioning the processing can also allow the computing system to perform functions in parallel, which also results in improved processing times.

In aspects, a computing system can perform the aforementioned functions by implementing methods to generate by a GPU an image pyramid based on an input image received. In aspects, the input image received can represent an image of an environment in which an autonomous vehicle is being operated. In aspects, a refined pose prior information may be generated by the GPU, where the refined pose prior information represents a location and orientation of an autonomous vehicle based on one or more images of the image pyramid. In aspects, one or more seed points may be selected by the GPU from the one or more images of the image pyramid. In aspects, the one or more seed points can represent pixel locations within one or more images of the image pyramid representing estimations of where an object in the vicinity of the autonomous vehicle is likely located. In aspects, one or more refined seed points may be generated by the GPU, where the one or more refined seed points represent the one or more seed points with added depth values. In aspects, one or more scene points may be generated by a CPU based on the one or more refined seed points. In aspects, a point cloud may be generated by the CPU based on the one or more scene points.

In aspects, a computing system can perform the aforementioned functions by implementing methods to generate a global point cloud, the global point cloud representing a plurality of point clouds. In aspects, the global point cloud can be mapped to a prior map information to locate a position of an autonomous vehicle, the prior map information representing pre-built geographic maps. In aspects, the position of the autonomous vehicle can be estimated based on applying sensor information obtained from sensors and software of the autonomous vehicle to the mapped global point cloud.

The following aspects are described in sufficient detail to enable those skilled in the art to make and use the disclosure. It is to be understood that other aspects are evident based on the present disclosure, and that system, process, or mechanical changes may be made without departing from the scope of the aspects of the disclosure.

In the following description, numerous specific details are given to provide a thorough understanding of the disclosure. However, it will be apparent that the disclosure may be practiced without these specific details. In order to avoid obscuring aspects of the disclosure, some well-known circuits, system configurations, architectures, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in the aspects of the disclosure in accordance with the context in which the term is used. For example, the software may be machine code, firmware, embedded code, or application software. Also for example, the hardware may be circuitry, a processor (a CPU or a GPU), a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. The present solution is not limited to autonomous vehicle applications. The present solution may be used in other applications such as robotic applications, radar system applications, metric applications, and/or system performance applications.

System Overview and Function

FIG. 1 shows an exemplary autonomous vehicle system 100 in accordance with aspects of the disclosure. System 100 comprises an autonomous vehicle 102a that is traveling along a road in a semi-autonomous or autonomous manner. Autonomous vehicle 102a can include, but is not limited to, a land vehicle (as shown in FIG. 1), an aircraft, or a watercraft.

Autonomous vehicle 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116. When such a detection is made, autonomous vehicle 102a performs operations to generate one or more possible object trajectories for the detected object and analyze at least one of the generated possible object trajectories to determine whether or not there is an undesirable level of risk that a collision will occur between the autonomous vehicle 102a and the object in a threshold period of time (e.g., 1 minute). If so, the autonomous vehicle 102a performs operations to determine whether the collision may be avoided if a given vehicle trajectory is followed by the autonomous vehicle 102a and any one of a plurality of dynamically generated emergency maneuvers is performed in a pre-defined time period (e.g., N milliseconds). If the collision may be avoided, then the autonomous vehicle 102a takes no action or optionally performs a cautious maneuver (e.g., mildly slows down). In contrast, if the collision cannot be avoided, then the autonomous vehicle 102a immediately takes an emergency maneuver (e.g., brakes and/or changes direction of travel). Other approaches to collision detection and avoidance by autonomous vehicle 102a are contemplated by this disclosure as would be understood by one skilled in the relevant art.

Figure 2:
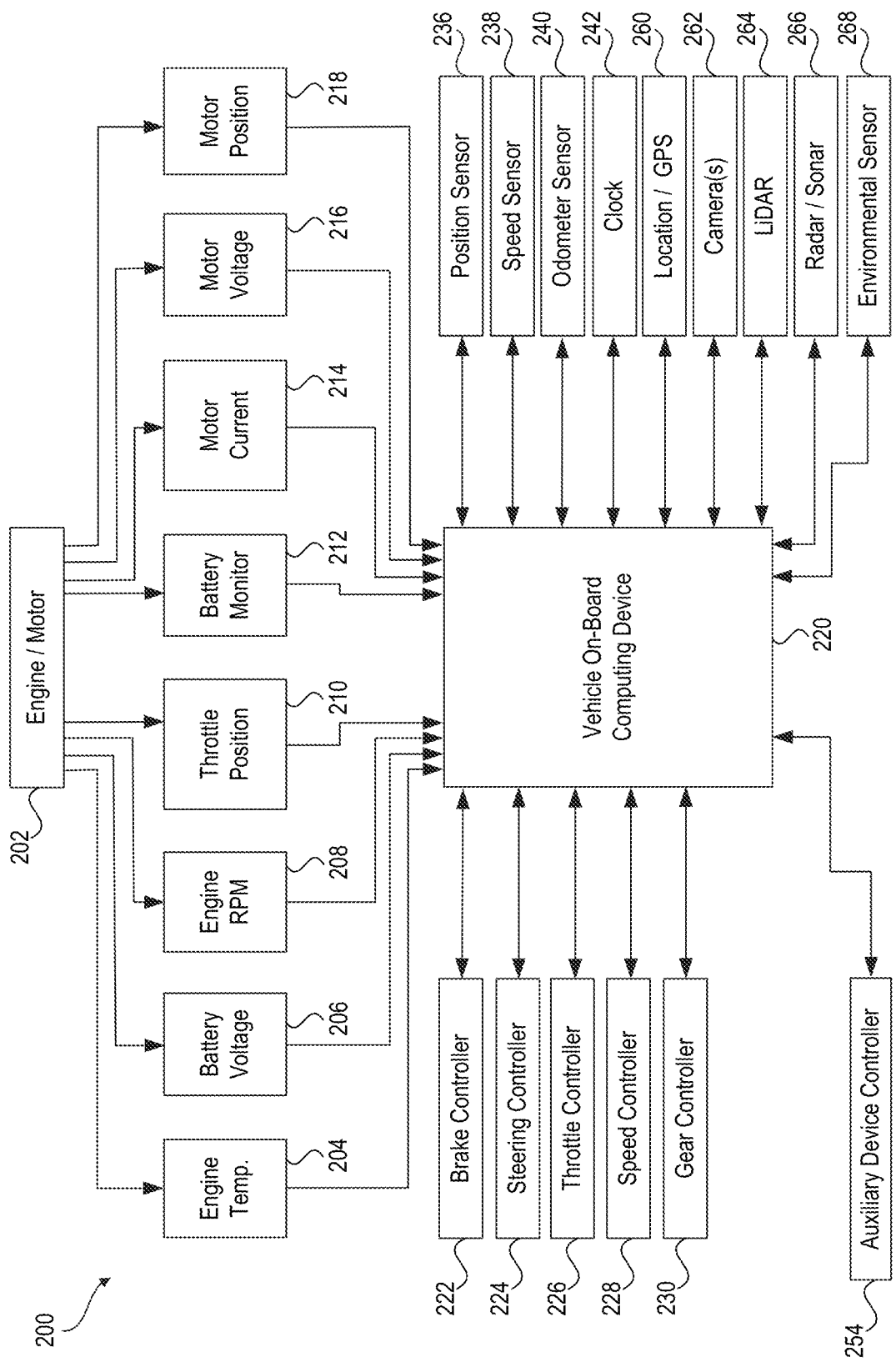
FIG. 2 shows an exemplary architecture for a vehicle in accordance with aspects of the disclosure.

FIG. 2 shows an exemplary architecture 200 for autonomous vehicle 102a in accordance with aspects of the disclosure. Autonomous vehicle 102a and/or vehicle 102b of FIG. 1 can have the same or similar system architecture as that shown in FIG. 2. Thus, the following discussion of system architecture 200 is sufficient for understanding vehicle(s) 102a, 102b of FIG. 1.

As shown in FIG. 2, autonomous vehicle 102a includes an engine or motor 202 and various sensors 204-218 for measuring various parameters of the autonomous vehicle 102a. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the autonomous vehicle 102a may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system 100 uses to determine vehicle time during operation. The clock 242 may be encoded into the vehicle on-board computing device, it may be a separate device, or multiple clocks may be available.

The autonomous vehicle 102*a* also includes various sensors that operate to gather information about the environment in which the autonomous vehicle 102*a* is traveling. These sensors may include, for example: a location sensor 260 (e.g., a Global Positioning System (GPS) device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the autonomous vehicle 102*a* to detect objects that are within a given distance range of the autonomous vehicle 102*a* in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the autonomous vehicle 102*a* based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR 264 is communicated from those sensors) to the on-board computing device 220. The object detection information and/or captured images are processed by the on-board computing device 220 to detect objects in proximity to the autonomous vehicle 102*a*. Any known or to be known technique for making an object detection based on sensor data and/or captured images may be used in the aspects disclosed in this document.

LiDAR information is communicated from LiDAR sensor 264 to the on-board computing device 220. Additionally, captured images are communicated from the camera(s) 262 to the on-board computing device 220. The LiDAR information and/or captured images are processed by the on-board computing device 220 to detect objects in proximity to the autonomous vehicle 102*a*. The manner in which the object detections are made by the on-board computing device 220 includes such capabilities detailed in this disclosure.

When the on-board computing device 220 detects a moving object, the on-board computing device 220 generates one or more possible object trajectories for the detected object, and analyzes the possible object trajectories to assess the risk of a collision between the object and the autonomous vehicle 102*a*. If the risk exceeds an acceptable threshold, the on-board computing device 220 performs operations to determine whether the collision may be avoided if the autonomous vehicle 102*a* follows a defined vehicle trajectory and/or implements one or more dynamically generated emergency maneuvers performed in a pre-defined time period (e.g., N milliseconds). If the collision may be avoided, then the on-board computing device 220 may cause the autonomous vehicle 102*a* to perform a cautious maneuver (e.g., mildly slow down, accelerate, or swerve). In contrast, if the collision cannot be avoided, then the on-board computing device 220 causes the autonomous vehicle 102*a* to take an emergency maneuver (e.g., brake and/or change direction of travel).

Figure 3:
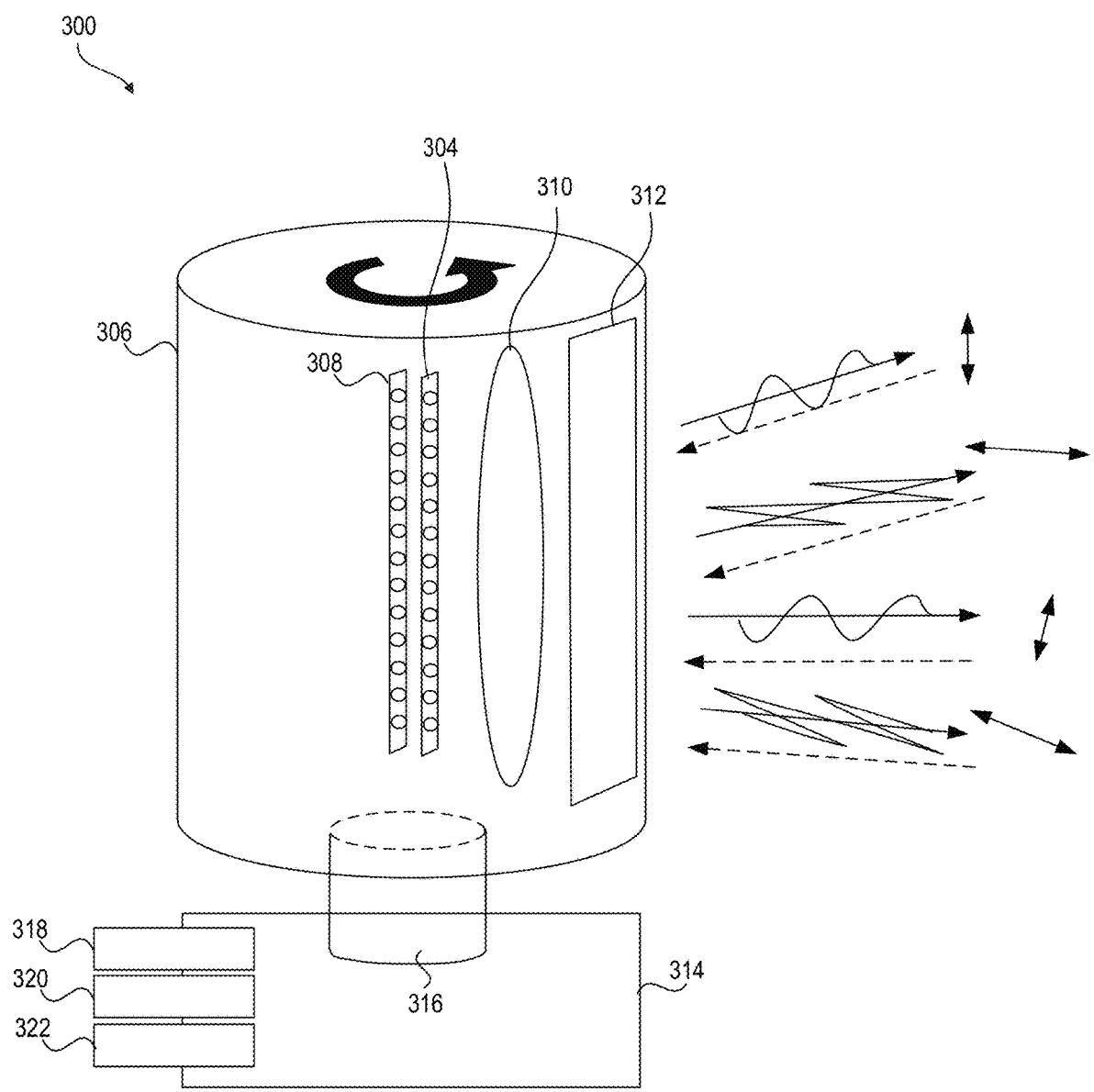
FIG. 3 shows an exemplary architecture for a Light Detection and Ranging (LiDAR) system in accordance with aspects of the disclosure.

FIG. 3 shows an exemplary architecture for a LiDAR system 300 in accordance with aspects of the disclosure. LiDAR system 264 of FIG. 2 may be the same as or substantially similar to the LiDAR system 300. As such, the discussion of LiDAR system 300 is sufficient for understanding LiDAR system 264 of FIG. 2.

As shown in FIG. 3, the LiDAR system 300 includes a housing 306, which may be rotatable 360° about a central axis such as hub or axle 316. The housing 306 may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the LiDAR system 300 can emit light through one or more of the aperture(s) 312, and receive reflected light back toward one or more of the aperture(s) 312 as the housing 306 rotates around the internal components. In alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The individual beams emitted by the light emitter system 304 have a well-defined state of polarization that is not the same across the entire array. As an example, some beams may have vertical polarization and other beams may have horizontal polarization. The LiDAR system 300 also includes a light detector 308 containing a photodetector or array of photodetectors positioned and configured to receive light reflected back into the LiDAR system 300. The emitter system 304 and light detector 308 would rotate with the rotating shell, or they would rotate inside the stationary dome of the housing 306. One or more optical element structures 310 may be positioned in front of the light emitting system 304 and/or the light detector 308 to serve as one or more lenses or waveplates that focus and direct light that is passed through the optical element structure 310.

One or more optical element structures 310 may be positioned in front of a mirror to focus and direct light that is passed through the optical element structure 310. As shown below, the LiDAR system 300 includes an optical element structure 310 positioned in front of the mirror and connected to the rotating elements of the LiDAR system 300 so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Optionally, each optical element structure 310 may include a beam splitter that separates light that the LiDAR system 300 receives from light that the LiDAR system 300 generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 includes a power unit 318 to power the light emitting system 304, a motor, and electronic components. LiDAR system 300 also includes an analyzer 314 with elements such as a processor 322 and non-transitory computer-readable memory 320 containing programming instructions that are configured to enable the LiDAR system 300 to receive data collected, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system 300 and communicatively connected to the LiDAR system 300 via a wired or wireless communication network 108 (shown in FIG. 1) or a link.

The network 108 may span and represent a variety of networks and network topologies. For example, the network 108 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 108. Cable, Ethernet, digital subscriber line (DSL), fiber optic lines, fiber to the home (FTTH), and plain old telephone service (POTS) are examples of wired communication that may be included in the network 108. Further, the network 108 may traverse a number of network topologies and distances. For example, the network 108 may include direct connection, personal area network (PAN), local area network (LAN), metropolitan area network (MAN), wide area network (WAN), or a combination thereof.

From time to time one of the aforementioned components can fail. Of particular relevance to this disclosure is the instance in which one of the sensors related to geographic location information for the autonomous vehicle 102a fails. In the event of such a failure the autonomous vehicle 102a may not be able to determine its position on a map and/or with respect to its surroundings. Thus, a system is needed to enable the autonomous vehicle 102a to continue operating and/or have time to fail gracefully in situations in which it would otherwise have little to no idea of the environment in which it is operating. In aspects, and as disclosed herein, a computing system 400 (shown in FIG. 4) is disclosed that can perform visual odometry to enable the autonomous vehicle 102a to continue operating and/or have time to fail gracefully. In aspects, the computing system 400 can utilize, for example, the cameras 262 of the autonomous vehicle 102a previously indicated, to perform the visual odometry. In aspects, as a result of performing the visual odometry, the computing system 400 can generate a dynamically generated map (also referred to as a point cloud) of the autonomous vehicle's 102a surroundings. The point cloud can enable the autonomous vehicle 102a to determine its position and orientation with respect to its surroundings so that it can continue operating and/or have time to fail gracefully.

Figure 4:
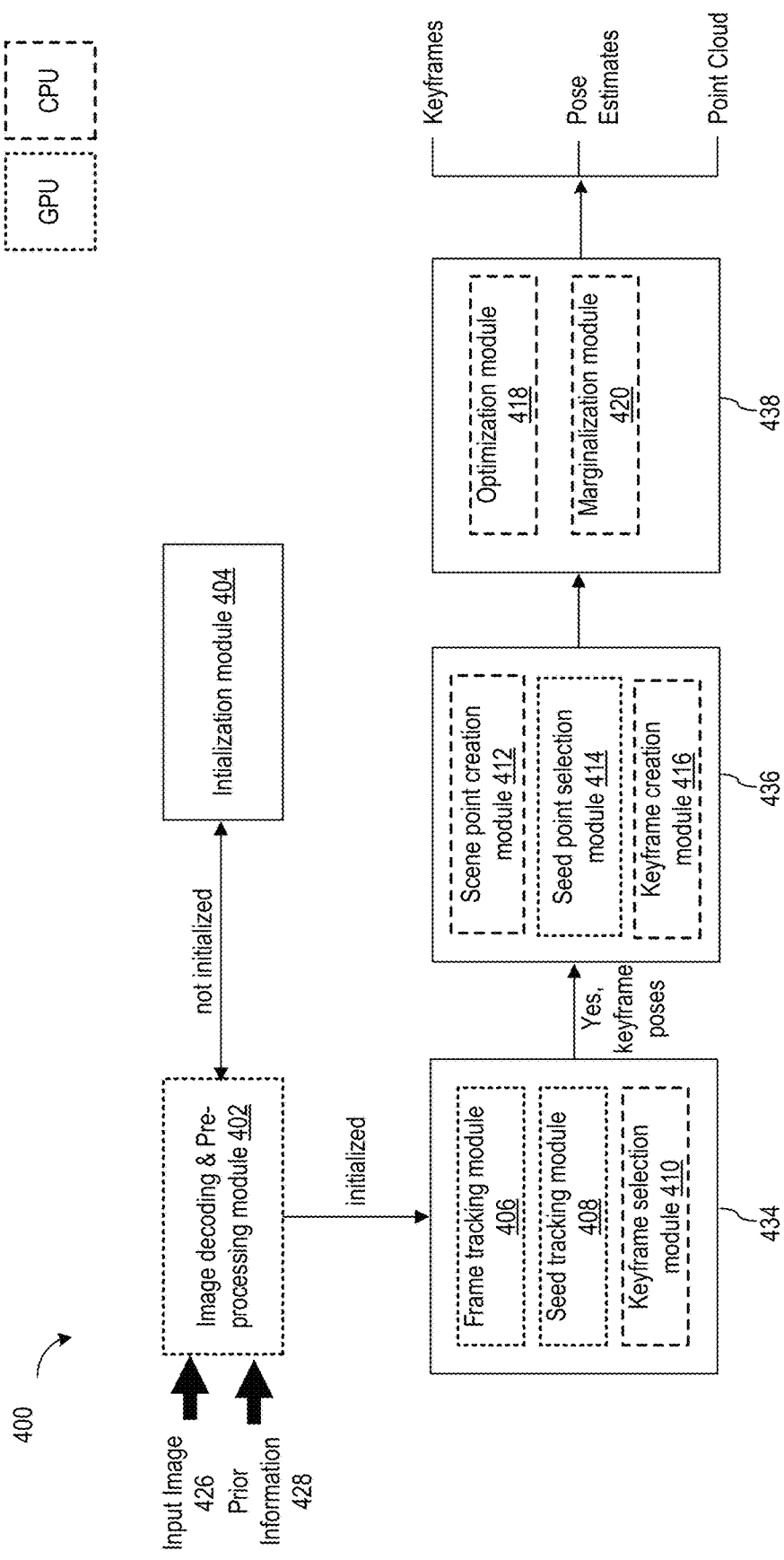
FIG. 4 shows a computing system for performing visual odometry for the autonomous vehicle in aspects of the disclosure.

FIG. 4 shows the computing system 400 for performing visual odometry for the autonomous vehicle 102a in aspects of the disclosure. In aspects, the computing system 400 can include modules to perform the visual odometry. In aspects, the modules can include an image decoding and pre-processing module 402, an initialization module 404, a frame tracking module 406, a seed tracking module 408, a keyframe selection module 410, a scene point creation module 412, a seed point selection module 414, a keyframe creation module 416, an optimization module 418, and a marginalization module 420. How the modules couple to one another to perform the visual odometry will be described in detail below.

In aspects, the computing system 400 may begin performing the visual odometry by receiving an input image 426. In aspects, the input image 426 may be an image of the autonomous vehicle's 102a surroundings. In aspects, the input image 426 may be obtained by the cameras 262 of the autonomous vehicle 102a. In aspects, the input image 426 may be received by the image decoding and pre-processing module 402. In aspects, the image decoding and pre-processing module 402 can enable decoding the input image 426. In aspects, decoding refers to converting the input image 426 into a red-green-blue (RGB) color model image with a timestamp. Throughout this disclosure, the RGB color model image with the timestamp will be referred to as a decoded image. A person of ordinary skill in the art (POSA) will recognize that converting the input image 426 into the RGB color model image with the timestamp is necessary for sensing, representing, and displaying the input image 426 in computer systems. In aspects, the conversion to the RGB color model image can result in the input image 426 being represented as a series of pixels, each having numeric representations indicating how much of the red, green, and blue colors are included to make up the color of each pixel. In aspects, a timestamp may be added to the input image 426 to indicate at what point in time the input image 426 was captured by a camera of the autonomous vehicle 102a, in order to track the input image 426.

In aspects, the image decoding and pre-processing module 402 can further enable debayering the input image 426. Debayering refers to a process by which a full color image of the input image 426 is reconstructed. A POSA will be familiar with debayering algorithms and how they are implemented. In aspects, the image decoding and pre-processing module 402 can further pre-process the input image 426 by performing a series of re-sizings and croppings of the input image 426 to obtain images of a desired size and dimension. In aspects, the image decoding and pre-processing module 402 can further pre-process the input image 426 by undistorting the input image 426 to remove any distortion effects caused by the camera equipment (e.g., the lens of the camera causing the input image 426 to have a "fishbowl" appearance). In aspects, the image decoding and pre-processing module 402 can further convert the decoded image into a greyscale model such that the computing system 400 performs subsequent operations on the greyscale model of the decoded image. In aspects, once the image decoding and pre-processing module 402 performs its functions, the output generated is an image that may be utilized as an initial or base level of an image pyramid.

In aspects, the image pyramid refers to a data structure that can store and/or represent a set of images in different scales. In aspects, the image pyramid can represent the input image 426 as a series of two-dimensional (2D) images in different scales. For example, in aspects, the different scales can refer to different pixel dimensions. Thus, in aspects, the image pyramid can represent the decoded and pre-processed input image 426 as a set of images with different pixel dimensions. By way of example, in aspects, the image pyramid may be arranged such that it has a first level with the decoded and pre-processed input image 426 represented as a 1000×800 pixel image; it has a second level with the decoded and pre-processed input image 426 represented as a 500×400 pixel image; it has a third level with the decoded and pre-processed input image 426 represented as a 250×200 pixel image; etc. In aspects, and as described with respect to FIG. 4, the scaling of the different levels of the image pyramid may be done by dividing the pixel dimensions of the preceding level of the image pyramid by two. In this way, image decoding and pre-processing module 402 can create a N-level representation of the decoded and pre-processed input image 426, where N is an integer indicating the number of levels of the image pyramid. In aspects, the number for N can vary depending on how coarse a resolution is desired for the levels of the image pyramid. For example, typical values for N may be N=3, N=4, or N=5, indicating three to five levels for the image pyramid.

In aspects, the further levels of the image pyramid may be obtained by using a Gaussian kernel. For example, the different levels of the image pyramid may be obtained by taking a base level of the image pyramid and scaling the image of the base level down using a Gaussian average (also known to a POSA as a Gaussian blur) for a patch surrounding a pixel to obtain a numerical values representing local averages of the colors and/or shading corresponding to the patch. The process may be repeated for other patches to generate other averages, which in aggregate can represent a scaled down image for each level of the image pyramid. This may be done to generate each level of the image pyramid.

In aspects, the image pyramid may be utilized in further processing steps of the computing system 400 as will be described below. In aspects, once the image pyramid is generated, control can pass to the initialization module 404 to determine whether to perform an initialization process utilizing the image pyramid. In aspects, the initialization process includes checking whether first keyframes exists such that the computing system 400 can perform the visual odometry using the first keyframes, the image pyramid, and previously known information regarding the prior locations and orientations of the autonomous vehicle 102a and/or objects in the autonomous vehicle's 102a vicinity. Throughout this disclosure, the previously known information regarding the prior locations and orientations of the autonomous vehicle 102a and/or objects in the vicinity of the autonomous vehicle 102a will be referred to as prior information 428. In aspects, the prior information 428 may be stored in a database, repository, or memory either on-board the autonomous vehicle 102a or on systems external to the autonomous vehicle 102a, from where it may be retrieved via the network 108 shown in FIG. 1. In aspects, the prior information 428 may be obtained and stored as the autonomous vehicle 102a is operated. In this way, the prior information 428 may be a record of the prior locations and orientations of the autonomous vehicle 102a and/or objects in the vicinity of the autonomous vehicle 102a.

In aspects, the first keyframes refer to first selected images from a stream of images being input into the computing system 400. In aspects, the first keyframes can form observations of the surroundings of the autonomous vehicle 102a. In aspects, the first keyframes may be utilized as starting or reference images of the autonomous vehicle's 102a surroundings. In aspects, the first keyframes may be utilized to compare further input images received by the computing system 400 to, in order to determine and estimate the position and orientation of the autonomous vehicle 102a and/or objects surrounding the autonomous vehicle 102a.

In aspects, the initialization module 404 can determine whether to perform the initialization process by checking if the first keyframes exist. If not, the initialization process can enable generation of the first keyframes. In aspects, if the first keyframes exist, the initialization module 404 can determine that no initialization process is needed, and can proceed to performing a first stage of processing 434 utilizing the image pyramid. In aspects, if the first keyframes do not exist, the initialization module 202 may begin performing the initialization process to generate the first keyframes.

In aspects, generating the first keyframes may begin by the initialization module 404 passing control to the seed point selection module 414 to perform a seed point selection process utilizing the image pyramid. Throughout this disclosure, and with respect to the initialization process, it is assumed that the image pyramid is the first image pyramid received by the computing system 400. Therefore, with respect to the initialization process, the image pyramid will be referred to as a first image pyramid to differentiate it from image pyramids generated after the computing system 400 is initialized.

Continuing with the discussion, in aspects, the seed point selection process can utilize the first image pyramid to select certain pixels of the first image pyramid as one or more first seed points. In aspects, the one or more first seed points can indicate where an object in the vicinity of the autonomous vehicle 102a might be located.

In aspects, because the first image pyramid can represent the input image 426 as a series of two-dimensional (2D) images, the one or more first seed points may be represented and/or identified as coordinate locations in a 2D space. For example, if the 2D space is represented as an x-y coordinate space, the one or more first seed points may be represented as pixel coordinates (x,y) in the x-y coordinate space of the first image pyramid. Further details of how the seed point selection module 414 performs the seed point selection process will be discussed below. For the purposes of discussion, and with respect to the initialization process, it is assumed that the seed point selection process is performed and the one or more first seed points are selected.

In aspects, once the seed point selection process is performed, control may be passed back to the initialization module 404, which can further determine whether enough of the one or more first seed points were selected during the seed point selection process such that the one or more first seed points may be utilized for further processing to generate the first keyframes. In aspects, the initialization module 404 can make the determination by comparing the number of the one or more first seed points selected to a predetermined threshold value to determine if the number of the one or more first seed points is greater than the predetermined threshold value. In aspects, if the number of the one or more first seed points selected is greater than the predetermined threshold value, the initialization module 404 can determine that enough of the one or more first seed points were selected. In aspects, if the number of the one or more first seed points is less than or equal to the predetermined threshold value, the initialization module 404 can terminate the initialization process and wait for further input images to be received by the computing system 400 to perform the initialization process on.

In aspects, based on determining that enough of the one or more first seed points were selected, control may be passed to the seed tracking module 408 to perform a seed tracking process. In aspects, the seed tracking process can refine the one or more first seed points selected by further adding a depth value to each of the one or more first seed points selected. In aspects, the added depth value represents a pixel location indicating an estimated depth associated with each of the one or more first seed points. Adding the depth value allows each of the one or more first seed points to be converted from a 2D pixel location to a three-dimensional (3D) pixel location (x, y, z), where z is the location of the depth value in a 3D space. In this way, a 3D image of the autonomous vehicle's 102a surroundings may begin to be generated. In aspects, the resulting one or more first seed points with the depth values may be referred to as one or more first refined seed points. How the seed tracking module 408 performs the seed tracking process to generate the added depth values will be discussed below. For the purposes of discussion with respect to the initialization process, it is assumed that the seed tracking process is performed and the one or more first refined seed points are generated.

In aspects, once the one or more first refined seed points are generated, the seed tracking module 408 can further determine whether or not the depth values generated are reliable estimations of depth for the first seed points. In aspects, the seed tracking module 408 can do this by making two determinations. In aspects, the first determination is to determine where on an epipolar line a pixel representing a depth value is located. Epipolar lines will be discussed in further detail below. A POSA will understand what is meant by the term epipolar line and how to determine whether a pixel is located on an epipolar line. For the purposes of discussion, and with respect to the initialization process, it is assumed an epipolar line exists such that the pixel associated with a depth value lays on that epipolar line. In aspects, to make the first determination, the seed tracking module 408 can determine an angle between the epipolar line and a gradient of the reference images of the first image pyramid. If the angle is within a threshold value to being perpendicular (i.e., 90 degrees) the depth values may be said to be an unreliable value for the estimated depth. However, if the angle is within a threshold value of being parallel (i.e., 0 degrees) the depth values may be said to be reliable. In aspects, if determined to be reliable, the seed tracking module 408 can proceed to the second determination.

In aspects, the second determination involves discretizing the epipolar line into a set of equally separated pixel locations. In aspects, a patch of pixels is selected surrounding each pixel location in the set. In aspects, the intensities of the patches are compared against a patch centered at the pixel coordinate location representing the depth values.

In aspects, based on comparing the intensities, photometric errors may be determined. Photometric errors refer to the weighted sum of squared differences (SSD) over a patch of pixels. The values for the photometric errors can indicate similarities or differences between intensities of the pixels. In aspects, the seed tracking module 408 can determine photometric errors between patches of pixels on the epipolar line and the patch centered at the pixel coordinate location representing the depth values. In aspects, the patch size can be represented by an area (e.g., 5 pixels squared, 8 pixels squared, etc.).

Based on determining the photometric errors, the seed tracking module 408 can select the two lowest photometric errors determined. In aspects, the seed tracking module 408 can then take the ratio of the lowest photometric error to the second lowest photometric error. If the ratio is above a certain threshold value, the depth value may be determined to be reliable. If the ratio is below a certain threshold value, the depth value may be determined to be unreliable. This is because a value above the threshold indicates there is a strong contrast in the intensity between the pixel representing the depth value and the surrounding pixels. This contrast can represent the presence of an object by indicating that an edge of an object might exist.

In aspects, once the seed tracking module 408 performs its functions by determining the one or more first refined seed points and the reliability of the depth values for those one or more refined seed points, control may be passed back to the initialization module 404 to determine whether enough of the first refined seed points have reliable depth values to be able to be used to generate one or more first scene points. In aspects, the determination may be made by comparing the number of first refined seed points that have depth values determined to be reliable to a predetermined threshold value to see if the number exceeds the threshold value. If so, the initialization module 404 may determine that enough of the one or more first refined seed points have reliable depth values to be used to generate the one or more first scene points.

In aspects, if the initialization module 404 determines that not enough of the one or more first refined seed points have reliable depth values, the initialization module 404 can pass control back to the seed point selection module 414 to restart the process over again (i.e., to select the one or more first seed points from the first image pyramid and pass the one or more first seed points to the seed tracking module 408, which can add depth values to the one or more first seed points, etc.). The purpose of repeating this process is to obtain one or more first refined seed points that may be utilized to generate the first keyframes.

In aspects, if the initialization module 404 determines that enough of the one or more first refined seed points are generated, the initialization module 404 can pass control and the one or more first refined seed points to the scene point creation module 412 to perform a scene point creation process. In aspects, the scene point creation process can determine which of the one or more first refined seed points should be selected to become one or more first scene points. In aspects, the one or more first scene points refer to optimized versions of the one or more first refined seed points. In aspects, the scene point creation module 412 can generate the optimized version of the one or more first refined seed points by running a non-linear optimization for each of the one or more first refined seed points. In aspects, an optimization algorithm, such as a Levenberg-Marquardt (LM) algorithm, is performed on the one or more first refined seed points. In aspects, the optimization can determine whether based on computations performed using the depth values of the one or more refined seed points result in a convergence to a global minimum value. A convergence may be determined if a change in the cost function (also referred to as a "cost" throughout this disclosure) per iteration of the optimization is smaller than a predetermined threshold value, or an absolute cost is smaller than a predetermined threshold value. A cost function or cost refers to a photometric error weighted with a kernel or robust function. A photometric error is formed using the extracted pixel locations of an incoming image (e.g., the input image 426) with a scene point depth value. For the purposes of discussion, and with respect to the initialization process, it is assumed a cost value is generated. In aspects, the optimization can also terminate if a divergence is detected by the optimization process in which the values are not converging. In the event a divergence is detected, a first refined seed point is not used and discarded.

In aspects, once the optimization is performed on the one or more first refined seed points, the one or more first refined seed points may be said to have become or converted to one or more first scene points. In aspects, the one or more first scene points may be utilized to generate the first keyframes representing a first graphical or pictorial representation of the autonomous vehicle's 102a surroundings. In aspects, the one or more first scene points may be processed to generate the first keyframes. This is done by generating images based on the one or more first scene points.

In aspects, the first keyframes may be utilized by the computing system 400 as reference keyframes, such that further input images received, and data obtained from/or generated based on the further input images may be compared to, and referenced with, the first keyframes to estimate the autonomous vehicle's 102a position and location in its surrounding environment, or to provide estimations of where objects are located in the autonomous vehicle's 102a surrounding environment.

In aspects, once the initialization process is complete, or once the initialization module 404 determines that the initialization process is not needed, the computing system 400 can continue performing the visual odometry by passing control and any obtained and/or generated data to one or more modules of the computing system 400 to perform a first stage of processing 434. In aspects, the obtained and/or generated data can include the first image pyramid, the one or more first scene points, the one or more first seed points, the one or more first refined seed points, the one or more first scene points, the first keyframes and any associated image pyramids, etc. In aspects where the initialization process is not needed, the obtained and/or generated data can include an image pyramid and the prior information 428, which can include the first image pyramid, the one or more first scene points, the one or more first seed points, the one or more first refined seed points, the one or more first scene points, the first keyframes and any associated image pyramids, etc.

In aspects, the first stage of processing 434 may be performed by the frame tracking module 406, the seed tracking module 408, and the keyframe selection module 410. In aspects, the frame tracking module 406, the seed tracking module 408, and the keyframe selection module 410 can perform a frame tracking process, a seed tracking process, and a keyframe selection process to perform the first stage of processing 434.

In aspects, the frame tracking module 406 can perform a frame tracking process to generate a refined pose prior information representing an estimation of the location and position of the autonomous vehicle 102a based on an image pyramid and prior information 428. It is assumed that one or more keyframes and one or more scene points exist (due to the computing system 400 being initialized) such that any input images received (and image pyramids generated as a result by the computing system 400) may be compared to and/or against the latest keyframe of the one or more keyframes stored and the one or more scene points to perform the frame tracking process. In aspects, the one or more keyframes, similar to the first keyframes, are images selected from streams of images being input into the computing system 400. In aspects, the one or more scene points may be similar to the one or more first scene points, except they represent scene points selected in previously processed input images.

In aspects, the frame tracking module 406 can perform the frame tracking process by receiving an image pyramid. For the purposes of discussion, and with respect to the remainder of this disclosure, it will be assumed that the computing system 400 has been initialized and that any image pyramid being processed is a further image pyramid received after the initialization process has been performed. Such further image pyramids will simply be referred to as image pyramids or an image pyramid for simplicity. This is to differentiate them from the first image pyramid discussed with respect to the initialization process.

In aspects, the frame tracking process may begin by projecting all the scene points known to the computing system 400 onto the image pyramid generated as a result of the most recent incoming input image 426. In aspects, the frame tracking module 406 can generate the refined pose prior information by performing an optimization on the one or more scene points projected. The purpose of the optimization is to generate more refined and accurate estimations for the position and location of the autonomous vehicle 102a. In aspects, the optimization may implement a coarse to fine approach. In aspects, the optimization implementing the coarse to fine approach may be done by projecting the one or more scene points onto the highest levels of the image pyramid and running an optimization to compare intensities of patches of the one or more scene points to patches of pixels in the images of the image pyramid. In aspects, a cost term may be generated as a result of the comparisons. The cost term represents a value generated as a result of comparing the brightness of the pixels associated with the one or more scene points to patches of pixels in the image pyramid. In aspects, as a part of the optimization, brightness parameters may be aligned between the one or more scene points and the patches of pixels in the image pyramid. In aspects, parameters may be adjusted for the one or more scene points in an attempt to obtain a cost term having a zero or near zero value. The cost term can be the output of the optimization. A zero or near zero value for the cost term indicates that images in the image pyramid, and one or more scene points are aligned such that their intensities match up. Matching intensities indicates that the one or more scene points may represent the same points as those in the images of the image pyramid. In this way, the one or more scene points existing in the computing system 400 may be aligned with the input images received. In this way, refined pose prior information can be obtained.

By way of example, the optimization may be performed by comparing shading of one or more scene points, to the position and/or shading of the pixels of one or more images of the image pyramid. In aspects, by performing this comparison the frame tracking module 406 can track and/or identify any changes with respect to the location and/or shading between the two.

In aspects, this comparison may be performed by comparing the pixel positions and/or shading of the one or more scene points to pixels in the one or more images at each level of the image pyramid starting from the most coarse levels (or lowest resolution levels) to the finest resolution levels (or highest resolution levels) of the image pyramid. By having the frame tracking process perform the comparison in this manner, a more accurate estimate of movements may be obtained. This is because as the levels of the image pyramid scale down (i.e., become coarser), one pixel represents a larger area in the one or more images. As a result, as pixel-by-pixel comparisons in each level are made, the comparisons may be refined and corrected to converge on pixels more accurately representing estimated changes in locations and positions of the autonomous vehicle 102*a*. In aspects, in order to perform the comparisons, the frame tracking module 406 can perform a coarse-to-fine Gauss-Newton (GN) optimization or a Levensberg-Marquadt (LM) optimization. A POSA will recognize how to implement a GN and LM optimization. Based on performing GN or LM optimizations on the image pyramid, photometric errors for the image pyramid may be minimized and brightness parameters may be affined for the images indicating changes in location and/or shading of the pixels between the one or more images of the image pyramid and the one or more scene points.

In aspects, the seed tracking module 408 can perform the seed tracking process previously described with respect to the initialization process to generate one or more first refined seed points, except to generate one or more refined seed points. In aspects, the one or more refined seed points may be similar to the one or more first refined seed points except they are refined seed points for input images received after the initialization process. The purpose of doing the seed tracking process in the first stage of processing 434 is the same as what was described with respect to the initialization process, which is to add depth values and determine the uncertainty with respect to the depth values (using the techniques discussed with respect to the initialization process) for one or more seed points known to the computing system 400.

In aspects, the seed tracking module 408 can generate the added depth values for the one or more seed points using the same techniques described with respect to the initialization process, for example, utilizing an epipolar line to determine a coordinate for the estimated depth values. In aspects, the determination of the depth values and the epipolar line may be done by first utilizing a delta pose between a keyframe associated with the one or more seed points, and pixels of the image pyramid. In aspects, the delta pose refers to a transformation that maps the one or more seed points to pixels of the one or more images of the image pyramid. In aspects, the delta pose allows the seed tracking module 408 to perform a one to one mapping of the one or more seed points to the pixels of the one or more images of the image pyramid. In this way, the delta pose can allow the seed tracking module 408 to track the one or more seed points based on input images received, for example for the one or more images of the image pyramid.

In aspects, the delta pose may be used to calculate an epipolar line. In aspects, the epipolar line refers to a straight line, which may be used to map the one or more seed points to pixels of the one or more images of the image pyramid. The use of delta poses and epipolar lines to map pixels across image planes is known, and a POSA will know how to map the seed points to pixels of the image pyramid. For the purposes of discussion with respect to performing the seed tracking process, it is assumed that the mapping is performed. In aspects, the mapping may be performed for the one or more seed points and for the different levels of the image pyramid. In this way, the one or more seed points may be mapped to multiple images and viewed from different perspectives.

In aspects, based on the mapping from different perspectives, a depth range (also referred to as depth values) may be determined. In aspects, the depth range refers to a range of values along the epipolar line that indicate a pixel location for an estimated depth associated with the one or more seed points. In aspects, the depth range may be a range of coordinate points and/or positions along the epipolar line indicating the estimated depth of the seed point. In aspects, values for the depth range may be a range of coordinates. In aspects, once the depth range is determined, the depth range may be stored by the computing system 400. In aspects, the depth range may be stored in a database, repository, or memory of the computing system 400. In aspects, the depth range may be inversed and the inverse values of the depth range may be stored by the computing system 400. It has been discovered that storing the inverse values for the depth range, and performing further computations using the inverse values for the depth range provides the computing system 400 more numerical stability and more accurate estimations than if the inverse values were not utilized. Therefore, it is preferred that the depth range be stored using the inverse values and computations performed using the inverse values.

In aspects, it may be the case that the one or more seed points along the epipolar line may not lay in an image boundary of an image of image pyramid. In other words, the one or more seed points are not associated with points of an image of the image pyramid. In this case, the seed tracking module 408 can discard the one or more seed points because no reliable depth may be ascertained for that seed point from the images of the image pyramid. In aspects, it may also be the case that the mapping has determined depth values/depth ranges that are unreliable. The reliability may be determined based on the techniques described with respect to the initialization process. In the case where too much uncertainty exists for the depth values/depth range computed, the seed tracking module 408 can discard the one or more seed points associated with the depth range/depth values, so that they are no longer used in further computations by the computing system 400. In this way, the seed tracking module 408 can filter for the most optimal one or more seed points.

In aspects, the keyframe selection module 410 can perform a keyframe selection process to determine whether the input image 426 associated with the image pyramid should become a keyframe for the computing system 400. In this way, the keyframe selection process via the keyframe selection module 410 can update and delete keyframes of the computing system 400, so that images that are relevant and the most up to date may be utilized by the computing system 400 to determine positions and locations of the autonomous vehicle 102*a* and/or to estimate positions of objects surrounding the autonomous vehicle 102*a*.

In aspects, the keyframe selection module 410 can perform the keyframe selection process by receiving the one or more scene points associated with existing keyframes. In aspects, the keyframe selection module 410 can utilize four criteria to determine whether an input image 426 should become a keyframe. In aspects, the criteria may be based on: (a) an optical flow (i.e., how far the pixels in the input image 426 have moved from the pixels in previous keyframes; (b) an optical flow without rotation (i.e., how far the pixels in the input image 426 have moved from the pixels in previous keyframes not accounting for any rotation in the movements of a camera of the autonomous vehicle 102*a*; (c) how similar the lighting and/or shading is between pixels in the input image 426 and the lighting and/or shading of pixels in previous keyframes; and (d) whether the conditions in (a)-(c) when represented as quantified values, aggregate and/or sum to a value that is greater than a predetermined threshold value.

In aspects, the keyframe selection module 410 can determine an optical flow (i.e., how far the pixels in the input image 426 have moved from the pixels in previous keyframes) based on equation (1) shown below:

$$f := (1/n \sum_{i=1}^{n} \|p - p'\|^2)^{1/2} \qquad (1)$$

In equation (1), f is the quantified value representing the optical flow, p represents a pixel location in the keyframe hosting the scene point associated with the pixel, p' represents a pixel location of a projected scene point onto the input image 426, and n is an integer. Based on equation (1), the keyframe selection module 410 can determine the optical flow (i.e., distance a pixel has moved between the input image 426 and a previously known keyframe).

In aspects, the keyframe selection module 410 can determine an optical flow without rotation based on equation (2) shown below:

$$f_t := \left(\frac{1}{n}\sum_{k=1}^{n} \|p - p'_t\|^2\right)^{\frac{1}{2}}, \qquad (2)$$

In equation (2), $f_t$ is a quantified value representing the optical flow without accounting for rotation of a camera of the autonomous vehicle 102a, p represents a pixel location in the keyframe hosting the scene point associated with the pixel, $p_t'$ represents a pixel location of a projected scene point within the input image 426 without accounting for rotation of a camera of the autonomous vehicle 102a, and n is an integer. Based on equation (2), the keyframe selection module 410 can determine the optical flow without accounting for rotation (i.e., distance a pixel has moved between the input image 426 and a previously known keyframe without accounting for any camera rotation).

In aspects, the keyframe selection module 410 can determine the similarity between the lighting and/or shading between pixels in the input image 426 and the lighting and/or shading of pixels in previous keyframes based on equation (3) shown below:

$$a := |\log(e^{a_3 - a_i} t_j t_i^{-1})| \qquad (3)$$

In equation (3), a is a quantified value representing the difference in lighting and/or shading between the input image 426 and the pixels in previous keyframes, i and j represent different keyframes, and t represents an exposure time of the associated image when collected by a camera of the autonomous vehicle 102a. Based on equation (3), the keyframe selection module 410 can determine a difference in lighting and/or shading between the latest keyframe and the input image 426.

In aspects, based on determining the values from equations (1)-(3), the keyframe selection module 410 can perform a comparison based on the inequality (4) shown below:

$$w_f f + w_{ft} f_t + w_a a > T_{kf} \qquad (4)$$

In inequality (4) $w_f$, $w_{ft}$, and $w_a$ represent predetermined weightings; f, $f_t$, and a, are the same values as in equations (1)-(3); and $T_{kf}$ represents a predetermined threshold value. In aspects, the predetermined weighting and predetermined threshold value may be determined based on heuristic models and/or through trial and error to determine what the optimal weightings and threshold values should be, such that if inequality (4) holds, the keyframe selection module 410 can determine that the input image 426 should be selected to be a keyframe. The values for the predetermined weightings and predetermined threshold value might differ based on application, environment in which the autonomous vehicle 102a is operated, etc. For the purposes of discussion with respect to the keyframe selection module 410, it is assumed that these values exist. In aspects, the predetermined weightings and the predetermined threshold value may be real numbers.

In aspects, the criteria described above for determining how input images should be selected to become keyframes is based on several underlying principles. First, implementing criteria and/or equations (1) and (2) allow the keyframe selection module 410 to determine which input images are relevant for determining movement of the autonomous vehicle 102a and/or objects surrounding the autonomous vehicle 102a. This is because input images with pixels that have larger distances between their pixels and those of previous keyframes may be said to be either fading away, moving away from the keyframes, or simply have objects that are not visible anymore in the input image or the keyframe. If it is determined that objects in input images are fading away, moving away, or are no longer visible, it may be determined that some of the keyframes may no longer be relevant in determining what is in the immediate surroundings of the autonomous vehicle 102a. In aspects, this information may be used to generate new keyframes or delete keyframes that are no longer relevant.

In aspects, if the computing system 400 is memory constrained, and can only store a predetermined number of keyframes, the keyframe selection module 410 may be utilized to determine which keyframes should be created and which should be discarded. By way of example, if the computing system 400 is implemented to keep up to only 5 keyframes at a time, rules may be implemented for the keyframe selection module 410 to discard keyframes with less than 5% of their one or more scene points visible in the latest input image 426. This is because keyframes with less than 5% of their one or more scene points visible might no longer be relevant to determining what is in the immediate surroundings of the autonomous vehicle 102a. The aforementioned is an example. Other thresholds, percentages, and rules consistent with the above example may be implemented or applied to delete keyframes.

In aspects, a further underlying principle for implementing criteria and/or equation (3) is that the criteria allows the keyframe selection module 410 to determine which keyframes are no longer relevant and/or that need to be deleted based on an additional parameter, which is brightness and/or pixel shading. Thus, in aspects, keyframes that have higher or larger values indicating brightness changes between their pixels and the input image 426 may be deleted because they may be said to have, for example, fading objects or objects that are no longer visible in the input images, or that the lighting conditions have changed too much in a scene (e.g., entering and exiting a tunnel), such that certain objects are no longer visible.

In aspects, the keyframe selection module 410 can have further rules implemented that removes from consideration input images with duplicate information contained in existing keyframes. For example, in aspects, the keyframe selection module 410 can remove keyframes by calculating a Euclidean distance score between two keyframes. In aspects, the Euclidean distance score can determine how similar the two keyframes are. In aspects, the Euclidean distance score may be determined based on equation (5) shown below:

$$s(I_i) = \sqrt{d(i, 1)} \sum_{j \in [3,n] \setminus \{i\}} (d(i, j) + \varepsilon)^{-1} \qquad (5)$$

In aspects, $s(I_i)$ represents a value for the Euclidean distance, i and j represent different keyframes, d(i,j) represents a distance between the keyframes, and ε represents a constant used to provide numerical stability to the equation. In aspects, ε can represent a value close to zero (e.g., the value of $1 \times 10^{-4}$)) to prevent equation (5) from having an infinite value.

In aspects, the smaller the distance computed, the more closely related and/or identical the information in the keyframes are. For example, keyframes with a distance of zero or less than a predetermined threshold value from zero may be determined to have duplicate information. In aspects, a keyframe with duplicate information as other keyframes can be deleted or replaced by an input image 426.

In aspects, once the frame tracking module 406, the seed tracking module 408, and the keyframe selection module 410 perform their functions, the first stage of processing 434 is complete. In aspects, and once the first stage of processing 434 is complete, control may be passed to further modules of the computing system 400 to perform a second stage of processing 436 utilizing the outputs generated and/or determined by the first stage of processing 434. In aspects, the second stage of processing 436 should be performed only if the keyframe selection module 410 determines that an image should become a keyframe. If such a determination is not made, the computing system 400 can end its processing and output the refined pose prior information generated by the frame tracking module 406 as the output of the computing system 400 to be utilized by further computing systems.

In aspects, and assuming an image is selected to become a keyframe by the keyframe selection module 410, the second stage of processing 436 may be performed by the scene point creation module 412, the seed point selection module 414, and the keyframe creation module 416. In aspects, the scene point creation module 412, the seed point selection module 414, and the keyframe creation module 416 can perform a scene point creation process, a seed point selection process, and a keyframe creation process.

In aspects, the seed point selection module 414 can perform the seed point selection process on an image pyramid, similar to what was described with respect to the initialization process, except to generate one or more seed points for input images received after the computing system 400 is initialized. In aspects, the one or more seed points may be similar to the one or more first seed points except they are seed points for input images received after the computing system 400 is initialized. In aspects, the seed point selection process can utilize the image pyramids to select certain pixels of the image pyramids as the one or more seed points indicating where an object is in the vicinity of the autonomous vehicle 102a and/or where the autonomous vehicle 102a is estimated to be.

In aspects, the seed point selection module 414 can perform the seed point selection process by receiving an image pyramid generated by the image decoding and pre-processing module 402, and dividing one or more images of the image pyramid into block regions. In aspects, each block region will have a block height and block width. In aspects, the block height and block width may be represented as pixel dimensions. In aspects, for each block region, the seed point selection module 414 can select a pixel with the largest image gradient as a seed point. In aspects, the aggregate of seed points selected may be the one or more seed points.

In aspects, the image gradient refers to a directional change in the intensity or color in the image. It has been discovered that the pixel with the largest image gradient indicates how distinct a point is, and is more likely to represent an object or an edge of an object within the image. Thus, the higher the image gradient, the more distinct a pixel is likely to be, indicating the presence of an object or an edge of an object. In this way, pixels may be selected indicating where an object is estimated to be. For example, a lighter to darker color and/or shading gradient can indicate an object or an edge of an object in the image. Thus, the pixels with the most intense or largest changes in the image gradient from lighter to darker may be chosen (or vice versa) as the one or more seed points because they can indicate objects most distinctly.

In aspects, the computing system 400 can perform the seed point selection process until a desired amount of the one or more seed points are generated. In aspects, when performing the seed point selection process the block height and block width may be adjusted (i.e., increased and decreased) to cover more or less area in the images as desired to vary the number of the one or more seed points generated. In this way, more or less seed points may be generated as desired.

In aspects, the one or more seed points selected by the seed point selection module 414 may be stored and processed by the computing system 400. For example, the seed tracking module 408 can process the one or more seed points as described previously to add a depth value/depth range for the one or more seed points in order to generate the one or more refined seed points. In aspects, the one or more refined seed points may be utilized for the scene point creation process, etc.

In aspects, the scene point creation module 412 can perform the scene point creation process, similar to what was described with respect to the initialization process, except to generate one or more scene points based on input images received after the computing system 400 is initialized. In aspects, the one or more scene points may be similar to the one or more first scene points except represent scene points for input images received after the initialization process. In aspects, the scene point creation module 412 can determine if the one or more refined seed points generated by the computing system 400 should become one or more scene points.

In aspects, the scene point creation process may begin by making a series of determinations about the one or more refined seed points. In aspects, the determinations may be used to filter for the one or more refined seed points that meet the criteria for becoming the one or more scene points. In aspects, the determinations can include: (a) determining whether the length for the range of depth values for the one or more refined seed points along an epipolar line is smaller than a predetermined threshold value; (b) determining whether the ratio between the two smallest photometric errors calculated for the depth values for the one or more refined seed points is large compared to a predetermined threshold value; and (c) determining that the distance between known scene points and the one or more refined seed points is large compared to a predetermined threshold value.

In aspects, the purpose of determining whether the length for the range of depth values for the one or more refined seed points along the epipolar line is small, is to select the one or more refined seed points having depth values close to one another. It has been discovered that having depth values close to one another indicates more accurate depth value estimations for the one or more refined seed points. This is because depth values close to one another is an indication that the computing system 400 has determined consistent values for the depth values. By way of example, a predetermined threshold value may be set representing a length along the epipolar line. In aspects, that threshold value may be, for example, 5 pixels long. In aspects, if the length for the range of depth values for a refined seed point along the epipolar line is smaller than the predetermined threshold value (that is, all the depth values fall on points within a 5 pixel range), the scene point creation module 412 can determine that the depth values determined are likely to be accurate such that the values represent an accurate representation of the depth for the refined seed point.

In aspects, the purpose of determining whether the ratio between the two smallest photometric errors calculated for the depth values for the one or more refined seed points is large compared to a predetermined threshold value, was described above with respect to the initialization process and the functions of the seed tracking module 408. A large value indicates that the depth values determined are reliable.

In aspects, the purpose of determining whether the distance between the one or more scene points and the one or more refined seed points is large compared to a predetermined threshold value, is to make sure none of the one or more scene points are created with duplicate information as previously known scene points. In aspects, the scene point creation module 412 can make the determination by projecting known one or more scene points onto an input image 426 received, and projecting one or more refined seed points to the same input image 426 received, and determining whether the scene points represent duplicate points on the image as the one or more refined seed points. This may be done by checking of the distance between scene points and refined seed points is within a threshold distance (i.e., pixel length) of one another in the input image 426. If the distance is determined to be within the threshold distance (e.g., within 4 pixels the points may be determined to represent duplicate points and one of the points may be discarded. In other words, the points within the threshold distance may be said to likely represent duplicate information. In aspects, the one or more refined seed points with duplicate information may be filtered and/or removed from consideration to become further one or more scene points.

In aspects, for the one or more refined seed points determined to meet all the criteria (a)-(c) above, the scene point creation module 412 can continue to perform the scene point creation process by performing a GN optimization on the one or more refined seed points to generate the one or more scene points. In aspects, the GN optimization may be performed for the one or more refined seed points using all observation points for the one or more refined seed points. In other words, all keyframes should be utilized to perform the GN optimization to check whether values generated as a result of the GN optimization performed on the one or more refined seed points converge to a set of values. Convergence indicates that the one or more refined seed points are represented accurately across the keyframes. In aspects, once the GN optimization is performed for the one or more refined seed points, the one or more refined seed points on which the optimization is performed on may be determined to meet the criteria for becoming one or more scene points.

In aspects, once the scene points are generated, the keyframe creation module 416 can perform the keyframe creation process to generate keyframes based on the one or more scene points. In aspects, the keyframes may be generated based on the input images determined by the keyframe selection module 410 to become keyframes. In aspects, one or more scene points associated with the input images determined to become keyframes may be passed to the keyframe creation module 416. In aspects, the keyframe creation module 416 can utilize the one or more scene points to generate the keyframe.

In aspects, the keyframe creation module 416 can generate one or more observations by projecting the one or more scene points and existing scene points stored on the computing system 400 to a keyframe to generate the new keyframe. In aspects, the keyframe creation module 416 can further check whether photometric errors at the projection pixel locations are smaller than a threshold value. If the photometric errors are smaller than a threshold value, an observation is created. The observation represents a combination of the keyframe and the one or more scene points which results in an image or frame representing the environment of the autonomous vehicle 102a.

In aspects, once the new keyframe is generated and/or created, the new keyframe may be further refined by performing some optimizations on the new keyframe in a third stage of processing 438. In aspects, the third stage of processing 438 may be performed to optimize the outputs of the second stage of processing 436, and to generate a keyframe and/or a point cloud based on the outputs of the second stage of processing 436 and prior information 428. In aspects, the third stage of processing 438 may be performed by the optimization module 418 and the marginalization module 420. In aspects, the optimization module 418 and the marginalization module 420 can perform an optimization process and a marginalization process. In aspects, the third stage of processing 438 can be performed in parallel (i.e., simultaneously) with the first stage of processing 434 and the second stage of processing 436.

In aspects, the optimization module 418 can perform an optimization process to further optimize the parameters previously determined for the one or more scene points and keyframes. In aspects, these include depths for the one or more scene points, keyframe poses, or any of previously indicated parameters used and/or generated to generate the one or more scene points and keyframes. In aspects, nonlinear optimizations may be performed to determine photometric errors and determine a cost value. In aspects, the cost value may be similar to those generated in optimizations performed in the frame tracking process and scene point creation process. In aspects, the optimization process can perform the optimizations on the parameters simultaneously, taking all of the various parameters into account, while performing the optimizations. In this way, the overall set of parameters known to the computing system 400 may be optimized.

For example, in aspects, the optimization module 418 can calculate errors for the one or more observations generated. In aspects, the errors can indicate poor alignment between the one or more scene points and the existing keyframes such that points or pixels in the existing keyframes do not align with the one or more scene points. In aspects, errors may be calculated based on performing non-linear optimization techniques. In aspects, the errors may be calculated based on a cost function, similar to what was described previously in this disclosure. In aspects, a First Estimate Jacobian (FEJ) technique can be adopted in the optimization techniques. The purpose of using the FEJ technique is to improve numerical stability when performing the optimization. A POSA will be familiar with how to implement a FEJ technique.

In aspects, once the optimization is successfully completed, the marginalization module 420 can perform a marginalization process to delete or remove keyframe and scene point parameters from the optimization as indicated by the keyframe selection process. In this way, only the most up to date keyframes and/or scene points may be utilized to determine position and/or location information for the autonomous vehicle 102a and/or to identify objects surrounding the autonomous vehicle 102a.

In aspects, and independent of the marginalization process, the third stage of processing 438 can further include a process by which observations are checked and if observations have photometric errors larger than a predetermined threshold value those observations may be removed from consideration by the computing system 400 regardless of whether any deletions of keyframes takes place.

In aspects, once the optimization module 418 and the marginalization module 420 perform their functions, the third stage of processing 438 is complete. In aspects, the result is that the computing system 400 has one or more scene points, keyframes, and other optimized values such as optimized pose estimates and values of the position and location of the autonomous vehicle 102a based on all the data that was processed in the aforementioned stages of processing. In aspects, the one or more scene points may be further utilized to generate the point cloud. In aspects, the point cloud may be represented as the one or more scene points. In this way, points representing objects in the autonomous vehicle's 102a surroundings may be represented. The aggregate of the points can give outlines of objects that may be utilized as the point cloud. The point cloud can allow the autonomous vehicle 102a to navigate its surroundings and to avoid and/or react to objects as they appear or are identified.

In aspects, the aforementioned modules and processes may be performed by either a GPU or a CPU. In aspects, the computing system 400 may be partitioned in a manner that has certain modules and processes performed by either a GPU or a CPU. It has been discovered that partitioning the computing system 400 improves conventional systems by providing a novel way to perform the processing required to perform the visual odometry. In aspects, the partition can have a GPU perform the functions and processes performed by the image decoding and pre-processing module 402, the frame tracking module 406, the seed tracking module 408, and the seed point selection module 414, while the remaining functions and processes are performed by a CPU. It has been discovered that the splitting of the processing functions in this way greatly improves processing times for performing the visual odometry because the functions and processes performed by the image decoding and pre-processing module 402, the frame tracking module 406, the seed tracking module 408, and the seed point selection module 414 involve rendering images and image processing. These tasks are typically better handled by GPUs because they involve computations that involve the computing system 400 performing the same computation over a large number of iterations, and may be done in parallel because these computations have no dependency on one another, and these computations are lightweight (i.e., they don't take many computation cycles to compute).

Partitioning the processing this way also reduces latency in the overall computing system 400, and greatly improves the time it takes to perform the visual odometry. This is because GPUs are better suited to perform computing tasks where computations are to be done in parallel, while CPUs are better suited to perform computing tasks where computations are done linearly where the output of one computation is the input of another. Because the functions and processes of the image decoding and pre-processing module 402, the frame tracking module 406, the seed tracking module 408, and the seed point selection module 414 involve computations that are more efficiently done in parallel, it has been determined that performing these computations utilizing GPUs will greatly speed up the processing for these modules.

An added benefit of partitioning the processing is that multiple processors may be utilized for the computing system 400, which allows the computing system 400 to perform functions in parallel. Additionally, greater modularization of the computing system 400 may be achieved because functions and processes may be done separately from one another. This modularization has the benefit of allowing more robust error detection because errors may be isolated and detected in the computing system 400 more easily.

The modules described with respect to FIG. 4 may be implemented as instructions stored on a non-transitory computer readable medium to be executed by one or more computing units such as a processor (e.g., a CPU and/or a GPU), a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the computing system 400 or installed as a removable portion of the computing system 400.

Figure 5:
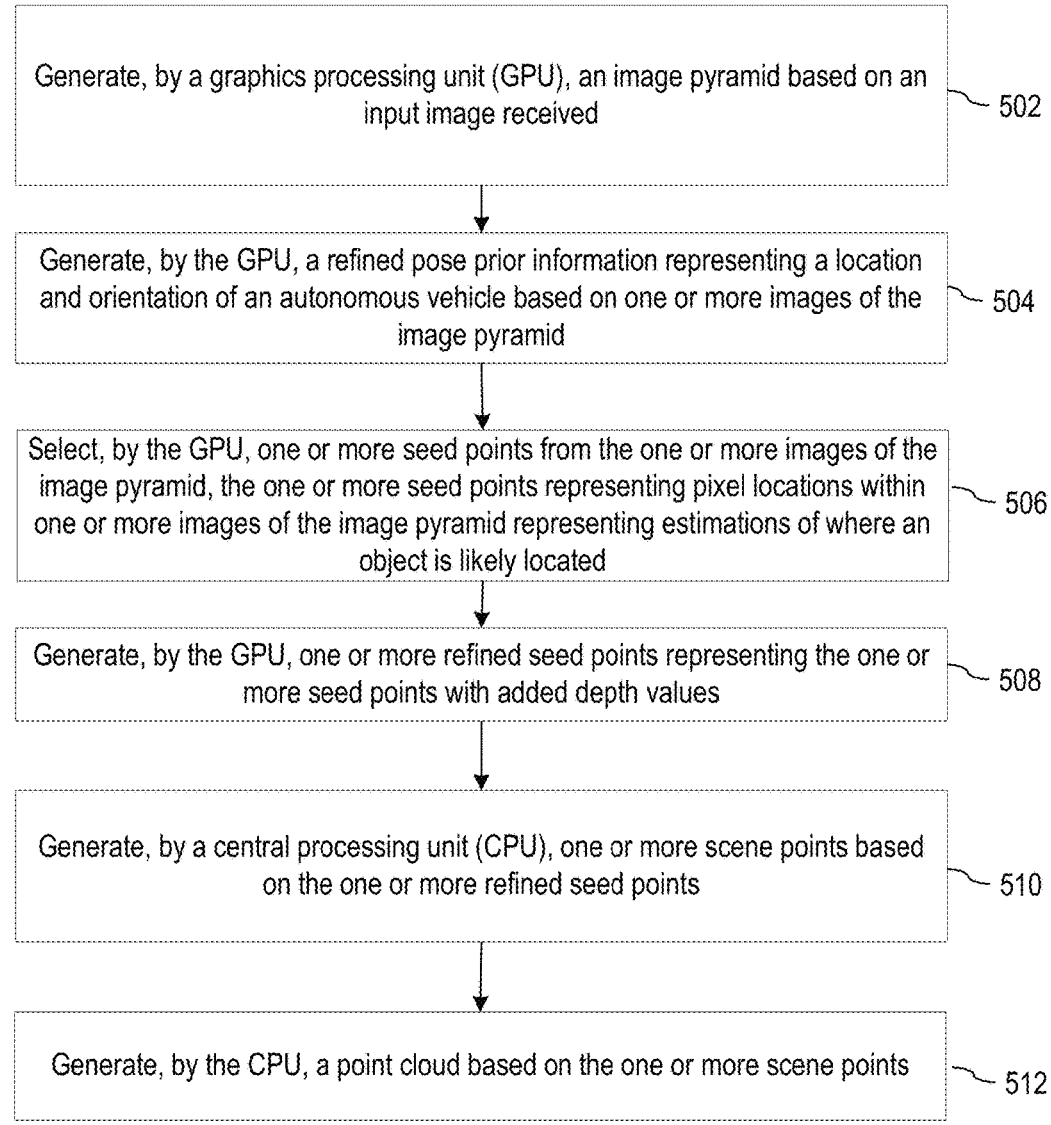
FIG. 5 shows an example method of performing the visual odometry in aspects of the disclosure.

FIG. 5 shows an example method 500 of performing the visual odometry, in aspects of the disclosure. In aspects, method 500 may be performed by the modules of the computing system 400. As shown in 502, in aspects, method 500 may be performed by having a GPU generate an image pyramid based on an input image 426 received. In aspects, the input image 426 may be received by the image decoding and pre-processing module 402. In aspects, the input image 426 received can represent an image of an environment in which an autonomous vehicle 102a is being operated.

As shown in 504, in aspects, the GPU can generate a refined pose prior information representing a location and orientation of the autonomous vehicle 102a based on one or more images of the image pyramid. In aspects, the refined pose prior information may be generated by the frame tracking module 406.

As shown in 506, the GPU can select one or more seed points from the one or more images of the image pyramid. In aspects, the one or more seed points can represent pixel locations within one or more images of the image pyramid representing estimations of where an object is likely located. In aspects, the selection of the one or more seed points may be done by the seed point selection module 414.

As shown in 508, in aspects, the GPU can generate one or more refined seed points representing the one or more seed points with added depth values. In aspects, the one or more refined seed points may be generated by a seed tracking module 408.

As shown in 510, in aspects, the CPU can generate one or more scene points based on the one or more refined seed points. In aspects, the one or more scene points may be generated by the scene point creation module 412.

As shown in 512, in aspects, the CPU can generate a point cloud based on the one or more scene points.

Figure 6:
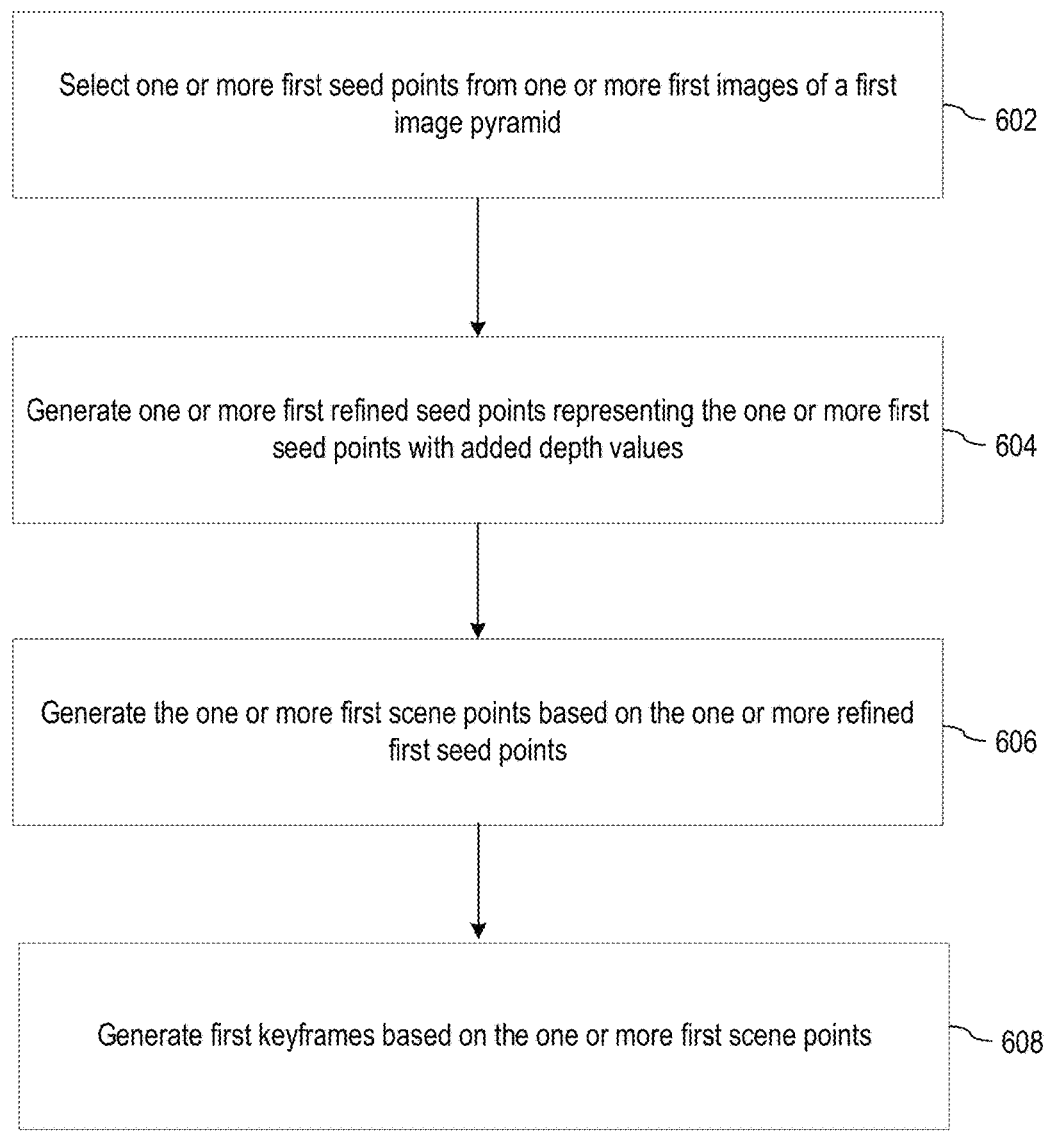
FIG. 6 shows an example method of performing an initialization process for the computing system in aspects of the disclosure.

FIG. 6 shows an example method 600 of performing the initialization process for the computing system 400, in aspects of the disclosure. In aspects, the initialization process may be performed by the initialization module 404. In aspects, method 600 may be performed by either a GPU or a CPU. For example, the seed point selection processes and seed tracking process performed as a part of the initialization process can be performed by a GPU, while the scene point creation process can be performed by a CPU.

As shown in 602, in aspects, method 600 may begin by selecting one or more first seed points from one or more first images of a first image pyramid. As shown in 604, in aspects, one or more first refined seed points may be generated representing the one or more first seed points with added depth values. As shown in 606, in aspects, one or more first scene points may be generated based on the one or more refined first seed points. As shown in 608, in aspects, first keyframes may be generated based on the one or more first scene points.

The operations of methods 500 and 600 may be performed by computing system 400, in accordance with aspects described above.

The aforementioned modules and processes with respect to FIGS. 4-6 are performed based on each of the cameras 262 of the autonomous vehicle 102a taking in images. Thus, each of the cameras 262 can input images into the computing system 400 that may be utilized to create the one or more scene points and keyframes representing a certain perspective or observation for the surroundings of the autonomous vehicle 102a. In aspects, the aforementioned cameras 262 may be cameras with global shutter mechanisms. In aspects, once the one or more scene points are generated for each perspective or observation, they may be aggregated to provide a global point cloud of the surroundings of the autonomous vehicle 102a. The purpose of doing this is to determine where every object in the vicinity of the autonomous vehicle 102a is. In aspects, the global point cloud can further be matched with prior map information 710 (further discussed with respect to FIG. 7). In aspects, the prior map information 710 can refer to detailed pre-built maps of streets, cities, buildings, or other geographic areas generated using, for example, LiDAR systems such as LiDAR system 300. In aspects, the prior map information 710 can have information about objects and points that may be utilized when determining the position and/or orientation of the autonomous vehicle 102a or objects surrounding the autonomous vehicle 102a. By matching the global point cloud to the prior map information 710, the position and/or location of the autonomous vehicle 102a and/or objects in the vicinity of the autonomous vehicle 102a may be better determined because information known from prior map information 710 may be used to obtain further details of objects in the vicinity of the autonomous vehicle 102a and supplement the information obtained via the global point cloud.

Figure 7:
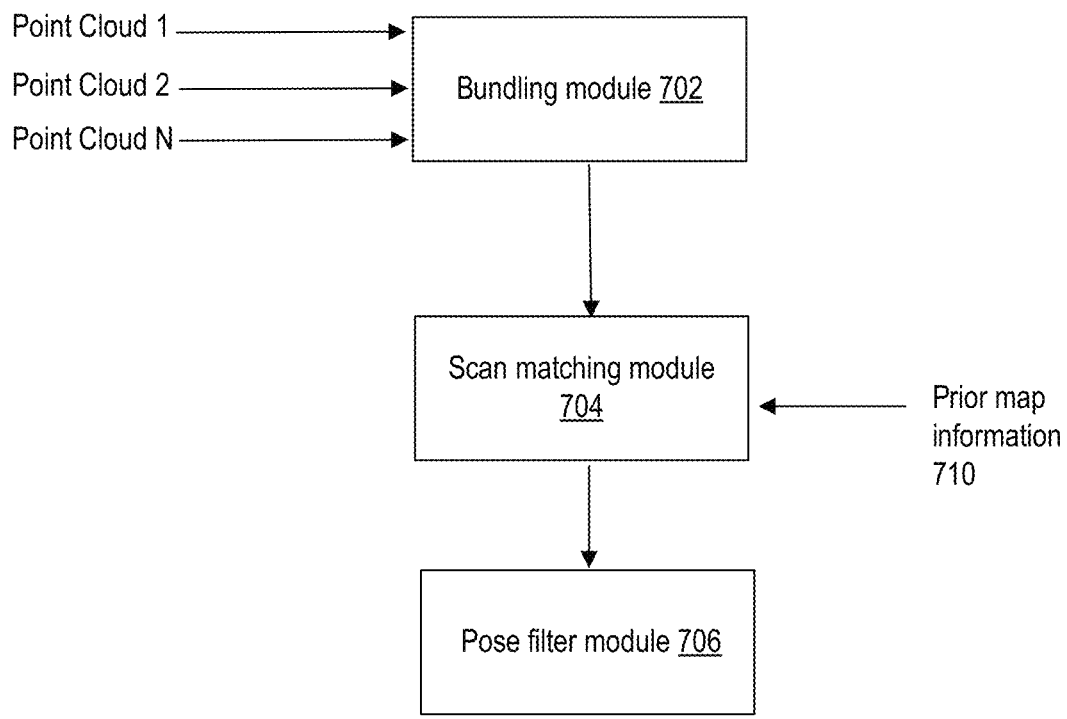
FIG. 7 shows a computing system used to generate a global point cloud and to map the global point cloud to the prior map information in aspects of the disclosure.

FIG. 7 shows a computing system 700 used to generate the global point cloud and to map the global point cloud to the prior map information 710 in aspects of the disclosure. In aspects, the computing system 700 can have several modules to perform its functions. In aspects, these modules can include a bundling module 702, a scan matching module 704, and pose filter module 706.

In aspects, the bundling module 702 can enable the bundling or fusing of one or more generated point clouds from the different cameras 262 of the autonomous vehicle 102a. In aspects, the bundling module 702 can receive the one or more generated point clouds. In FIG. 7, these point clouds are shown as {point cloud 1, point cloud 2, . . . , point cloud N}. In aspects, each point of the one or more generated point clouds (as represented by the one or more scene points) may be projected onto the various keyframes generated from all cameras 262. In aspects, based on the projections, the bundling module 702 can perform an analysis to determine which of the one or more scene points are observed across all cameras 262. If observed, a photometric error can be calculated for the one or more scene points observed. By checking all the one or more scene points from all the cameras 262, the computing system 700 can generate all possible photometric errors for those scene points.

In aspects, an optimization process, similar to those mentioned before can be done to minimize photometric errors by optimizing scene point depths and keyframe poses for all cameras 262 when considered together. In aspects, some of the one or more scene points may be duplicated across cameras 262. The duplications are handled by checking whether projections of the one or more scene points are close (based on calculating a $L^2$ distance in the pixel coordinate, as should be understood by a POSA) to scene points selected from a keyframe image. In aspects, the optimization can give a set of optimized scene point depths and keyframes with cross camera matches. Upon being optimized successfully, the optimized one or more scene point depths can be used as the optimized global point cloud for further processes. The purpose of this optimization is to have a point cloud that is consistent across cameras 262.

In aspects, once the bundling module 702 performs its functions, control can pass to the scan matching module 704. In aspects, the scan matching module 704 can enable the mapping of the global point cloud to the prior map information 710 in order to determine where the autonomous vehicle 102a is utilizing prior maps. In aspects, the scan matching module 704 can perform the mapping based on an Iterative Closest Point (ICP) algorithm. A POSA will be familiar with ICP algorithms. The principle underlying utilization of the ICP algorithm is to align the global point cloud and the prior map information 710. In aspects, this may be done by having the ICP algorithm transform the global point cloud onto the prior map information 710 to determine the orientation of the autonomous vehicle 102a based on the prior map information 710. In aspects, in order to perform this transformation an initial estimate of the autonomous vehicle's 102a location must be given to the ICP algorithm so that it has an initial starting point to determine the position of the autonomous vehicle 102a. In aspects, the initial estimate may be provided based on the prior information 428, the output of the bundling module 702, and/or information obtained by the one or more sensors described in FIG. 2. In aspects, the prior information 428, the output of the bundling module 702, and/or information obtained by the one or more sensors can allow the computing system 700 to have an initial estimate of the movements and/or position of the autonomous vehicle 102a. In aspects, the output of the ICP algorithm may be a global pose observation. In aspects, the global pose observation refers to an estimation of where the autonomous vehicle 102a is on a prior map.

In aspects, once the global pose observation is obtained, control and the global pose observation may be passed to a pose filter module 706. In aspects, the pose filter module 706 can further fuse the global pose observation to provide an even more accurate estimation for the global pose observation by providing any corrections needed to better align the global pose observation with the prior map information 710. In aspects, the pose filter module 706 can implement a Kalman Filter like filtering algorithm to perform the corrections. A POSA will be familiar with Kalman Filter like filtering algorithms. The purpose of the Kalman like filtering algorithm is to estimate the location and/or position of the autonomous vehicle 102*a* based on estimates of vehicle speed, and other information obtained by the vehicle sensors (i.e., sensor information) and software processing that sensor information, and tracking the movement of the autonomous vehicle 102*a* and estimating where the autonomous vehicle 102*a* is likely to be. In this way, future estimations of the position and/or location of the autonomous vehicle 102*a* may be obtained based on past movements as represented by the global point cloud and vehicle sensors.

Figure 8:
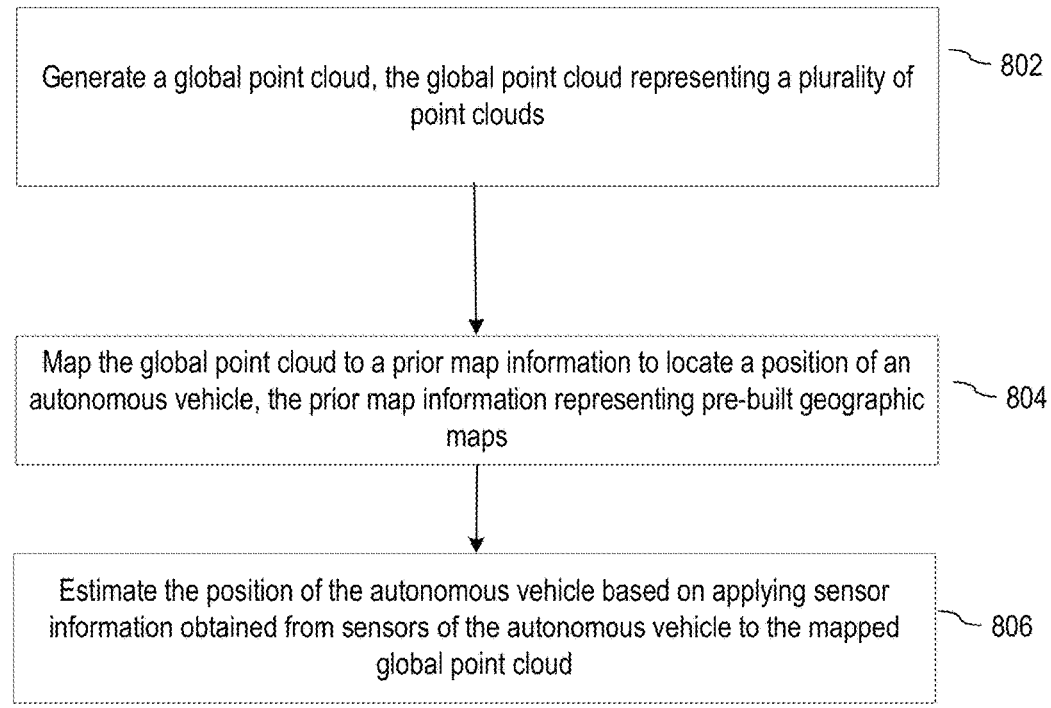
FIG. 8 shows an example method to generate a global point cloud and to map the global point cloud to the prior map information in aspects of the disclosure.

FIG. 8 shows an example method 800 to generate a global point cloud and to map the global point cloud to the prior map information 710 in aspects of the disclosure. In aspects, as shown in 802, the computing system 700 can generate a global point cloud, the global point cloud representing a plurality of point clouds. In aspects, as shown in 804, the global point cloud can be mapped to a prior map information 710 to locate a position of an autonomous vehicle 102*a*, the prior map information representing pre-built geographic maps. In aspects, and as shown in 806, the position of the autonomous vehicle 102*a* can be estimated based on applying sensor information obtained from sensors of the autonomous vehicle 102*a* to the mapped global point cloud. The operations of method 800 may be performed by computing system 700, in accordance with aspects described above.

Components of the System

FIG. 9 shows an example architecture 900 of the components implementing computing systems 400 and 700 in an aspect of the present disclosure. In aspects, the components may be integrated with the autonomous vehicle 102*a*. For example, the components may be integrated with the vehicle on-board computing device 220. In aspects, the components can include a control unit 902, a storage unit 906, a communication unit 916, and a user interface 912. The control unit 902 may include a control interface 904. The control unit 902 may execute a software 910 to provide some or all of the intelligence of computing systems 400 and 700. The control unit 902 may be implemented in a number of different ways. For example, the control unit 902 may be a processor (a CPU and/or a GPU), an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 904 may be utilized for communication between the control unit 902 and other functional units or devices of computing systems 400 and 700. The control interface 904 may also be utilized for communication that is external to the functional units or devices of computing systems 400 and 700. The control interface 904 may receive information from the functional units or devices of computing systems 400 and 700, or from remote devices 920, or may transmit information to the functional units or devices of computing systems 400 and 700, or to remote devices 920. The remote devices 920 refer to units or devices external to computing systems 400 and 700

The control interface 904 may be implemented in different ways and may include different implementations depending on which functional units or devices of computing systems 400 and 700 or remote devices 920 are being interfaced with the control unit 902. For example, the control interface 904 may be implemented with optical circuitry, waveguides, wireless circuitry, wireline circuitry to attach to a bus, an application programming interface, or a combination thereof. The control interface 904 may be connected to a communication infrastructure 922, such as a bus, to interface with the functional units or devices of computing systems 400 and 700 or remote devices 920.

The storage unit 906 may store the software 910. For illustrative purposes, the storage unit 906 is shown as a single element, although it is understood that the storage unit 906 may be a distribution of storage elements. Also for illustrative purposes, the storage unit 906 is shown as a single hierarchy storage system, although it is understood that the storage unit 906 may be in a different configuration. For example, the storage unit 906 may be formed with different storage technologies forming a memory hierarchical system including different levels of caching, main memory, rotating media, or off-line storage. The storage unit 906 may be a volatile memory, a nonvolatile memory, an internal memory, an external memory, or a combination thereof. For example, the storage unit 906 may be a nonvolatile storage such as nonvolatile random access memory (NVRAM), Flash memory, disk storage, or a volatile storage such as static random access memory (SRAM) or dynamic random access memory (DRAM).

The storage unit 906 may include a storage interface 908. The storage interface 908 may be utilized for communication between the storage unit 906 and other functional units or devices of computing systems 400 and 700. The storage interface 908 may also be utilized for communication that is external to computing systems 400 and 700. The storage interface 908 may receive information from the other functional units or devices of computing systems 400 and 700 or from remote devices 920, or may transmit information to the other functional units or devices of computing systems 400 and 700 or to remote devices 920. The storage interface 908 may include different implementations depending on which functional units or devices of computing systems 400 and 700 or remote devices 920 are being interfaced with the storage unit 906. The storage interface 908 may be implemented with technologies and techniques similar to the implementation of the control interface 904.

The communication unit 916 may allow communication to devices, components, modules, or units of computing systems 400 and 700 or to remote devices 920. For example, the communication unit 916 may further permit the devices of computing systems 400 and 700 to communicate with remote devices 920 such as an attachment, a peripheral device, or a combination thereof through a network 108, such as a wireless or wired network.

The network 108 may span and represent a variety of networks and network topologies. For example, the network 108 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 108. Cable, Ethernet, digital subscriber line (DSL), fiber optic lines, fiber to the home (FTTH), and plain old telephone service (POTS) are examples of wired communication that may be included in the network 108. Further, the network 108 may traverse a number of network topologies and distances. For example, the network 108 may include direct connection, personal area network (PAN), local area network (LAN), metropolitan area network (MAN), wide area network (WAN), or a combination thereof.

The communication unit 916 may also function as a communication hub allowing computing systems 400 and 700 to function as part of the network 108 and not be limited to be an end point or terminal unit to the network 108. The communication unit 916 may include active and passive components, such as microelectronics or an antenna, for interaction with the network 108.

The communication unit 916 may include a communication interface 918. The communication interface 918 may be utilized for communication between the communication unit 916 and other functional units or devices of computing systems 400 and 700 or to remote devices 920. The communication interface 918 may receive information from the other functional units or devices of computing systems 400 and 700, or from remote devices 920, or may transmit information to the other functional units or devices of the computing systems 400 and 700 or to remote devices 920. The communication interface 918 may include different implementations depending on which functional units or devices are being interfaced with the communication unit 916. The communication interface 918 may be implemented with technologies and techniques similar to the implementation of the control interface 904.

The user interface 912 may present information generated by computing systems 400 and 700. In aspects, the user interface 912 allows a user of computing systems 400 and 700 to interface with the devices of computing systems 400 and 700 or remote devices 920. The user interface 912 may include an input device and an output device. Examples of the input device of the user interface 912 may include a keypad, buttons, switches, touchpads, soft-keys, a keyboard, a mouse, or any combination thereof to provide data and communication inputs. Examples of the output device may include a display interface 914. The control unit 902 may operate the user interface 912 to present information generated by computing systems 400 and 700. The control unit 902 may also execute the software 910 to present information generated by computing systems 400 and 700, or to control other functional units of computing systems 400 and 700. The display interface 914 may be any graphical user interface such as a display, a projector, a video screen, or any combination thereof.

It is to be appreciated that the detailed description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects may be described using the expression "coupled" and "connected" along with their derivatives. These terms are not necessarily intended as synonyms for each other. For example, some aspects may be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer implemented method for performing visual localization, the method comprising:
   generating, by one or more computing devices, a global point cloud, the global point cloud representing a plurality of point clouds;
   mapping, by the one or more computing devices, the global point cloud to a prior map information to locate a position and orientation of an autonomous vehicle, the prior map information representing pre-built geographic maps;
   estimating, by the one or more computing devices, the position and orientation of the autonomous vehicle based on applying sensor information obtained from sensors and software of the autonomous vehicle to the mapped global point cloud;
   receiving, by the one or more computing devices, an initial estimate of the position and orientation of the autonomous vehicle; and
   mapping, by the one or more computing devices, the global point cloud to the prior map information based on the initial estimate to provide an enhanced determination of a surrounding of the autonomous vehicle.

2. The method of claim 1, further comprising generating the global point cloud based on:
   projecting one or more scene points of a point cloud of the plurality of point clouds onto one or more keyframes associated with a further point cloud; and
   performing an optimization process to minimize a photometric error to obtain the global point cloud, the photometric error being for the one or more scene points in the one or more keyframes.

3. The method of claim 2, further comprising checking, by the one or more computing devices, for duplicate one or more scene points across the one or more keyframes by checking whether projections of the one or more scene points are close in distance to further scene points from a keyframe image of the one or more keyframes.

4. The method of claim 2, further comprising performing the optimization process to generate a set of optimized scene point depths and keyframes with cross camera matches.

5. The method of claim 1, wherein the mapping of the global point cloud to the prior map information is performed by utilizing an Iterative Closest Point (ICP) algorithm to perform the mapping.

6. The method of claim 1, wherein the initial estimate of the position and orientation of the autonomous vehicle is obtained based on sensor data collected and processed as the autonomous vehicle is operated.

7. A non-transitory computer readable medium including instructions for causing one or more processors to perform operations for performing visual localization, the operations comprising:
  generating a global point cloud, the global point cloud representing a plurality of point clouds;
  mapping the global point cloud to a prior map information to locate a position and orientation of an autonomous vehicle, the prior map information representing pre-built geographic maps;
  estimating the position and orientation of the autonomous vehicle based on applying sensor information obtained from sensors and software of the autonomous vehicle to the mapped global point cloud;
  receiving an initial estimate of the position and orientation of the autonomous vehicle; and
  mapping the global point cloud to the prior map information based on the initial estimate to provide an enhanced determination of a surrounding of the autonomous vehicle.

8. The non-transitory computer readable medium of claim 7, wherein the operations further comprise generating the global point cloud based on:
  projecting one or more scene points of a point cloud of the plurality of point clouds onto one or more keyframes associated with a further point cloud; and
  performing an optimization process to minimize a photometric error to obtain the global point cloud, the photometric error being for the one or more scene points in the one or more keyframes.

9. The non-transitory computer readable medium of claim 8, wherein the operations further comprise checking for duplicate one or more scene points across the one or more keyframes by checking whether projections of the one or more scene points are close in distance to further scene points from a keyframe image of the one or more keyframes.

10. The non-transitory computer readable medium of claim 8, wherein the operations further comprise performing the optimization process to generate a set of optimized scene point depths and keyframes with cross camera matches.

11. The non-transitory computer readable medium of claim 7, wherein the mapping of the global point cloud to the prior map information is performed by utilizing an Iterative Closest Point (ICP) algorithm to perform the mapping.

12. The non-transitory computer readable medium of claim 7, wherein the initial estimate of the position and orientation of the autonomous vehicle is obtained based on sensor data collected and processed as the autonomous vehicle is operated.

13. A computing system for performing visual localization comprising:
  a storage unit to store instructions;
  a control unit, coupled to the storage unit, configured to process the stored instructions to:
    generate a global point cloud the global point cloud representing a plurality of point clouds;
    map the global point cloud to a prior map information to locate a position and orientation of an autonomous vehicle, the prior map information representing pre-built geographic maps;
    estimate the position and orientation of the autonomous vehicle based on applying sensor information obtained from sensors and software of the autonomous vehicle to the mapped global point cloud;
    receive an initial estimate of the position and orientation of the autonomous vehicle; and
    map the global point cloud to the prior map information based on the initial estimate to provide an enhanced determination of a surrounding of the autonomous vehicle.

14. The computing system of claim 13, wherein the control unit is further configured to generate the global point cloud by:
  project one or more scene points of a point cloud of the plurality of point clouds onto one or more keyframes associated with a further point cloud; and
  perform an optimization process to minimize a photometric error to obtain the global point cloud, the photometric error being for the one or more scene points in the one or more keyframes.

15. The computing system to claim 14, wherein the control unit is further configured to check for duplicate one or more scene points across the one or more keyframes by checking whether projections of the one or more scene points are close in distance to further scene points from a keyframe image of the one or more keyframes.

16. The computing system to claim 14, wherein the control unit is further configured to perform the optimization process to generate a set of optimized scene point depths and keyframes with cross camera matches.

17. The computing system of claim 13, wherein the initial estimate of the position and orientation of the autonomous vehicle is obtained based on sensor data collected and processed as the autonomous vehicle is operated.

* * * * *